United States Patent
Igaki et al.

(10) Patent No.: US 7,045,770 B2
(45) Date of Patent: May 16, 2006

(54) SENSOR USING ROOF MIRROR/ROOF PRISM ARRAY SCALE, AND APPARATUS EQUIPPED WITH THE SENSOR

(75) Inventors: Masahiko Igaki, Kanagawa (JP); Akio Atsuta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/216,900

(22) Filed: Aug. 30, 2005

(65) Prior Publication Data

US 2006/0028653 A1 Feb. 9, 2006

Related U.S. Application Data

(63) Continuation of application No. 10/441,862, filed on May 19, 2003.

(30) Foreign Application Priority Data

May 21, 2002 (JP) .............................. 2002/145920

(51) Int. Cl.
*G01J 5/34* (2006.01)
(52) U.S. Cl. .............................. 250/231.13; 250/237 G
(58) Field of Classification Search ..............................
250/231.13–231.18, 237 R, 237 G; 356/616, 356/617; 359/436, 457, 439–442
See application file for complete search history.

(56) References Cited

U.S. PATENT DOCUMENTS

| | | | |
|---|---|---|---|
| 4,468,094 A | 8/1984 | Inokuchi | |
| 4,736,225 A | 4/1988 | Tanaka et al. | |
| 6,975,408 B1 * | 12/2005 | Igaki et al. | ................. 356/616 |
| 2002/0000515 A1 | 1/2002 | Takayama et al. | |

FOREIGN PATENT DOCUMENTS

| | | |
|---|---|---|
| EP | 1 184 645 A1 | 8/2000 |
| WO | 01/63215 A1 | 8/2001 |

OTHER PUBLICATIONS

Sawada, et al. "Monolithic-Integrated Microlaser Encoder" Applied Optics, Optical Society of America. Nov. 20, 1999, pp. 6866-6873.
European Search Report, Dated Aug. 26, 2003.

* cited by examiner

*Primary Examiner*—Stephone B. Allen
(74) *Attorney, Agent, or Firm*—Morgan & Finnegan, L.L.P.

(57) ABSTRACT

A divergent light beam from a light source unit having a plurality of light-emitting regions is almost contained within the surface of a reflecting body that is an array of micro roof mirrors/roof prisms disposed in a regular manner. The light beam emitted from the light source unit with an angle of divergence is reflected by the reflecting body and is almost converged on a light-receiving surface. As a result, there is increased the ray density of a light beam on the light-receiving surface.

5 Claims, 38 Drawing Sheets

GAP (μm) AIR CONVERSION OPTICAL PATH LENGTH

GAP (μm) AIR CONVERSION OPTICAL PATH LENGTH

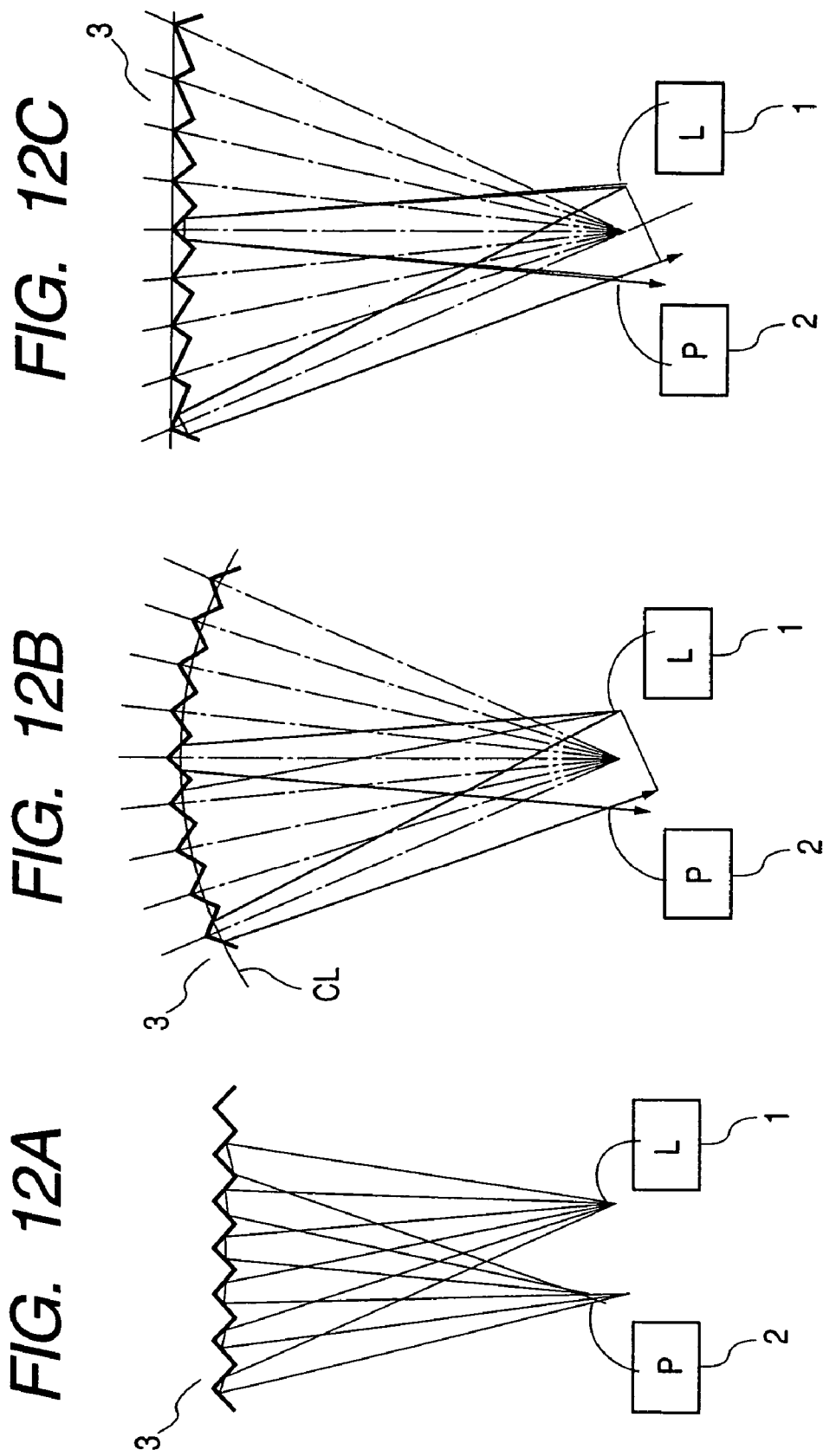

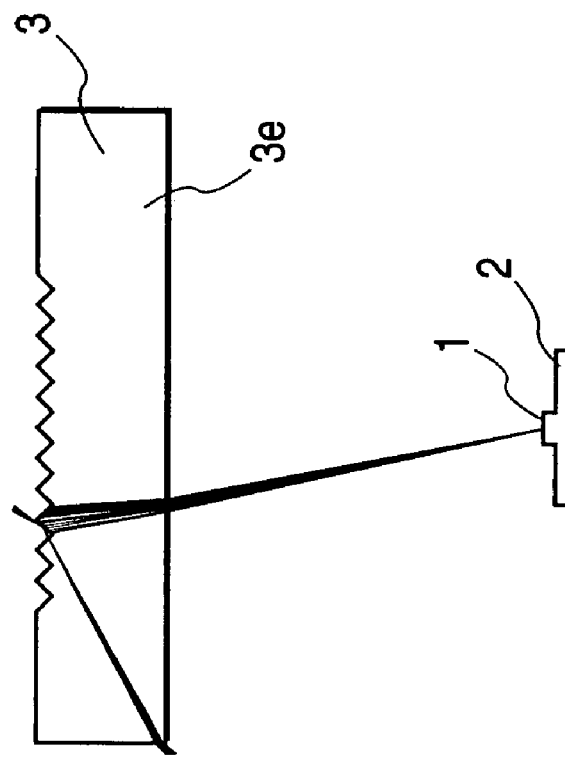
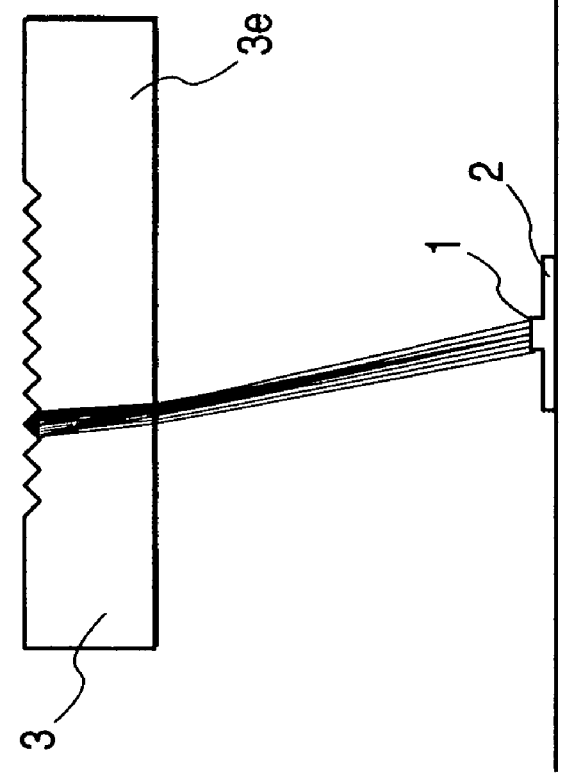

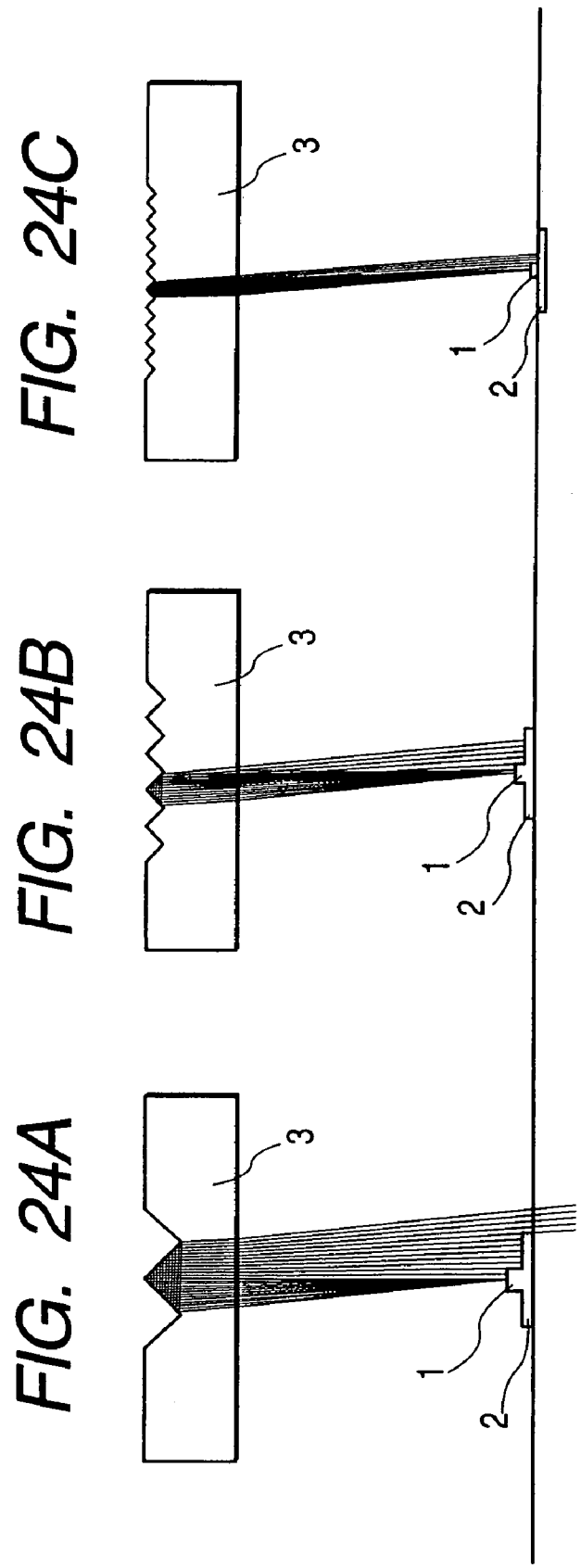

SENSOR USING ROOF MIRROR/ROOF PRISM ARRAY SCALE, AND APPARATUS EQUIPPED WITH THE SENSOR

This is continuation of co-pending application Ser. No. 10/441,862, filed May 19, 2003, the entirety of which are incorporated by reference herein.

BACKGROUND OF THE INVENTION

1. Field of the Invention

The present invention relates to a displacement measuring apparatus, and in particular to a displacement measuring apparatus, such as a linear encoder or a rotary encoder, that detects displacement information, such as the moving amount, moving speed, and rotation speed, of a moving body using an optical scale.

2. Related Background Art

There has conventionally been used a displacement measuring apparatus that detects displacement information of a moving body using three optical scales.

Such a displacement measuring apparatus is proposed in Japanese Patent Publication No. 60-23282, Japanese Utility Model Application Laid-Open No. 1-180615, and the like, for instance.

There will be described below conventional encoders disclosed in these patent documents that each use three gratings.

First, FIGS. 26 and 27 are each a schematic drawing showing the main portion of an optical system of the displacement measuring apparatus proposed in Japanese Patent Publication No. 60-23282.

In FIG. 26, reference numerals 103, 104, and 105 respectively denote a first scale, a second scale, and a third scale that each have a grating provided with light transmission portions and non-transmission portions at a constant pitch $P_1$, $P_2$, or $P_3$. Also, these first to third scales are each oppositely arranged approximately parallel to a displacement detecting direction 106. Reference numeral 101 indicates a light source that radiates a light flux whose luminescence center wavelength is $\lambda_m$, and reference numeral 102 indicates a light-receiving element. The second scale 104, the third scale 105, the light source 101, and the light-receiving element 102 are integrally contained within a single case. The first scale 103 is provided for a moving body (not shown) and is capable of moving in the direction of an arrow 106.

The light beam from the light source 101 is made incident on the second scale 104, is light-modulated by the second scale 104, and is made incident on the first scale 103. Then, the light beam is light-modulated by the first scale 103, is made incident on the third scale 105, is light-modulated by the third scale 105, and is made incident on the light-receiving element 102 to be detected.

Here, the space between the second scale 104 and the first scale 103 is referred to as "$\mu$", the space between the first scale 103 and the third scale 105 is referred to as "V", and a positive number is referred to as "n", as shown in the drawing. In this case, a geometrical real image concerning the grating of the first scale 103 and a diffraction optical real image concerning the grating of the first scale 103 are respectively formed by the light beam light-modulated by the second scale 104 and the first scale 103 at the position of the third scale 105 if Expressions (1) to (5) given below are satisfied.

(1-a) For geometrical real image $$P_1/P_2 = V(\mu+V) \quad (1)$$

$$P_1/P_3 = \mu(\mu+V) \quad (2)$$

$$1/\mu + 1/V = \lambda_m/(nP_1^2) \quad (3)$$

(1-b) For diffraction real image $$P_1/P_2 = 2V(\mu+V) \quad (4)$$

$$P_1/P_3 = 2\mu(\mu+V) \quad (5)$$

It should be noted that the geometrical real image and the diffraction optical real image will be hereinafter referred to as the "grating image".

Also, the grating image becomes an image having a periodic contrast with a pitch $P_3$ that is the same as a grating pitch $P_3$ of the third scale 105. In this case, if the first scale 103 moves in the direction of arrow the 106, the grating image forming on the third scale 105 also moves. As a result, the intensity of light passing through the third scale 105 changes along with the movement of the grating image and a periodic displacement signal concerning movement information of the first scale 103 is obtained from the light-receiving element 102. The illustrated displacement measuring apparatus detects movement information of the first scale 103, which is a moving body in this example, using the displacement signal obtained from the light-receiving element 102.

FIG. 27 is a schematic drawing showing the main portion of an optical system of another displacement measuring apparatus proposed in Japanese Patent Publication No. 60-23282 described above. The displacement measuring apparatus in this drawing differs from the displacement measuring apparatus shown in FIG. 26 in that a first scale 113 is of a reflection type and a second scale 116 doubles as a third scale, although there is used the same optical displacement detecting principle.

With the construction shown in FIG. 27, a light beam from a light source 111 is irradiated onto the second scale 116 through a half mirror 117, a light-modulated light beam from the second scale 116 is made incident on the first scale 113, and reflected which is light light-modulated by the first scale 113 is made incident on the second scale 116. Then, the light-modulated light beam from the second scale 116 is detected by a light-receiving element 112 through the half mirror 117.

As described above, there exist two types of displacement detecting systems based on the three-grating-type construction: a transmission-type displacement detecting system and a reflection-type displacement detecting system. However, the reflection-type displacement detecting system has more merits than the transmission-type displacement detecting system. For instance, the number of required scales is substantially reduced from three to two, as can be seen from FIG. 27. In addition, the reflection-type displacement detecting system is favorable in terms of miniaturization, in comparison with the transmission-type displacement detecting system.

The features of the reflection-type displacement detecting apparatus will be described in more detail below with reference to FIG. 27.

With the construction of the reflection-type displacement detecting apparatus, aforementioned Expression (3) "$1/\mu + 1/V = \lambda_m/(nP_1^2)$" is changed as follows.

In FIG. 27, the second scale and the third scale in FIG. 26 are integrally provided as the scale 116, so that a relation "μ=V" holds true in the above description. Therefore, Expression (3) is changed into Expression (6) given below.

$$V = \mu = 2n(P_1)^2/\lambda_m \text{ (where n=positive number)} \quad (6)$$

This expression indicates that when the space between the first scale 113 and the second scale (=third scale) 116 is set at "V" described above, an optical fringe pattern having a high contrast is formed on the surface of the third scale. Also, practically, two scales are arranged and used so as to have such a positional relation.

Under the three-grating-type detecting principle, Expression (6) is a general expression that gives a substantial positional relation that is in particular optimum for the reflection-type construction.

Next, there will be described FIG. 28 that is a schematic drawing showing the main portion of an optical system of the displacement measuring apparatus proposed in Japanese Utility Model Application Laid-Open No. 1-180615. In this drawing, reference numerals 123, 124, and 125 (125a, 125b) respectively denote a first scale, a second scale, and a third scale, numeral 121 a light source, and numeral 122 (122a, 122b) a light-receiving element.

The first scale 123 is produced using a reflection-type scale and is provided for a moving body (not shown) so as to be movable in the direction of the arrow 126. The principle of the first scale 123 to detect displacement information is the same as that of the displacement measuring apparatus illustrated in FIG. 26.

That is, a light beam from the light source 121 is made incident on the second scale 124 in a diverging manner, is light-modulated by the second scale, and is made incident on the first scale 123. Then, two reflected lights light-modulated by a displacement of the first scale 123 are detected by the light-receiving elements 122a and 122b through the third scales 125a and 125b provided adjacent to each other on approximately the same plane as the second scale 124. At this time, from the light-receiving elements 122a and 122b, there are obtained displacement signals concerning movement information of the first scale 123 in the direction of the arrow 126, as is the case of the displacement measuring apparatus in FIG. 26.

As the scales shown in FIGS. 26 to 28, there is generally used a metallic scale produced by forming many slit opening portions in a metallic substrate through etching, a glass scale produced by forming many slit opening portions in a glass substrate through evaporation of Chromium thin film or Aluminum thin film or the like and etching, or the like.

In either case of Japanese Patent Publication No. 60-23282 and Japanese Utility Model Application Laid-Open No. 1-180615 described above, a so-called three-grating theory is applied to displacement measurement.

As to the displacement measuring apparatus in FIG. 26 based on such a three-grating theory, there are further disclosed an "array-shaped light-receiving element (photosensitive element array)", in which the light-receiving element 102 and the third scale 105 are integrally provided, and an "array-shaped light source (light-emitting element array)" in which the light source 101 and the second scale 104 are integrally provided.

FIGS. 29 and 30 are each a schematic drawing showing the main portion of another optical system of the displacement measuring apparatus proposed in Japanese Utility Model Application Laid-Open No. 1-180615. In this patent document, as is the case of Japanese Patent Publication No. 60-23282, there are disclosed an "array-shaped light-receiving element 232 (photosensitive element array)" shown in FIG. 29 and an "array-shaped light source 230 (light-emitting element array)" shown in FIG. 30.

Still further, as other systems of the reflection type, there are proposed a construction shown in FIG. 32 where a shortage of light intensity is compensated for using a lens and a construction shown in FIGS. 33 and 34 where direct reflected light is used as a reflecting body and a distance between a reflecting body and a light source is further reduced, thereby avoiding the shortage of light intensity.

In the formerly described several prior arts proposing a system of the reflection type based on the three-grating principle and in the latterly described prior arts proposing a system in which there is made arrangement so that a lens is provided or the distance between a light source and a scale is reduced, however, there exists the following drawbacks.

In the reflection-type displacement measuring apparatus shown in FIG. 27, there is used a half mirror, so that the size of the apparatus is increased as a whole and the loss of intensity of light from the light source is considerably increased due to the existence of the half mirror. Accordingly, it is required to increase the intensity of light emitted from the light source, which results in an increase in power consumption.

In the displacement measuring apparatus shown in FIG. 28, light emitted in a light source optical axis direction (optical axis A of the light source in FIG. 28) has high intensity, but is not made incident on the light-receiving element and is reflected in a light source direction. This leads to a situation where the light does not become a substantially effective light beam, which also results in an increase in power consumption in a like manner.

Further, in the case of a displacement measuring apparatus functioning as an encoder or the like, it is generally required to obtain displacement signals in a plurality of different phases in order to detect a displacement direction as displacement information of a moving body.

In FIG. 28, in a like manner, in order to obtain a plurality of displacement signals having different phases, it is required to perform layout of various components such as the components 125b, 125a, 122b, and 122a in the illustrated manner. FIG. 31 shows a concrete arrangement of these components. In this drawing, there is illustrated a construction where light emitted from a light source 42 reaches a main scale 340 through an index scale 342, is reflected by the main scale 340, passes through the index scale 342 again, and reaches a light-receiving element 348.

In either case of the displacement measuring apparatuses shown in FIGS. 26, 27, and 28, in order to obtain a plurality of displacement signals having different phases, it is required to classify gratings of scales with reference to the number of required signals, perform layout of the gratings so as to have them displaced from each other by a predetermined phase difference, and provide a plurality of light-receiving elements in order to obtain respective signals. As a result, the apparatus becomes complicated as a whole. In addition, the sizes of the gratings (scales) and the total size of the apparatus are increased.

With the construction shown in FIG. 32 in which a lens is provided, there is obtained a result that is favorable in terms of the light intensity shortage problem but unfavorable in terms of miniaturization. If the distance between the lens and the light source is shortened and the lens curvature is reduced in order to realize miniaturization and thickness reduction, it is required to increase the accuracy of optical axis matching, which means that there are imposed limitations on size and thickness reduction. In order to enhance the accuracy and resolution, a higher-accurate lens performance is required, which hinders the realization of cost reduction.

In the case of the construction shown in FIGS. 33 and 34, in order to obtain a practical construction, it is required to cover the electric elements, such as the light-emitting element and the light-receiving element, with a protecting member, so that an adjacent arrangement is impossible to an extreme extent. Also, as can be seen from these drawings, a light beam on the optical axis of the light source is not made incident on the light-receiving portion, so that it is impossible to say that there is obtained sufficient light usage efficiency. In particular, this construction departs from the three-grating-type detecting principle to some extent, and is the equivalent of a construction where not a plurality of slits but only one slit is established in the optical scale arranged on the light source side. In this case, it is preferable that the size of the light-emitting region of the light source in the displacement direction of a reflection scale is set at around ½ of the pitch of a reflecting slit when the size setting is performed in compliance with the three-grating-type principle. As a result, it becomes necessary to use a light-emitting device that emits light within a minute window. If a current injected into the light source element is increased in order to obtain required intensity of received light with this construction, the current density is increased because the light-emitting region is minute, so that there may occur breakage of the elements. As a result, there is no choice but to limit the injection current.

As described above, in the reflection-type encoder in compliance with the three-grating-type principle, if a half mirror or the like is used as a reflecting means/construction, the apparatus size is increased, which has lead to a difficulty in realizing miniaturization up to now. Also, if there is made an attempt to realize miniaturization, it becomes impossible to effectively use on-axis rays of a light source, as can be seen from FIGS. 28, 31, 33, and 34. As a result, there occurs a shortage of light intensity.

In addition, the usage of a lens is conceivable as a measure to increase the light intensity, although this construction departs from the originally intended three-grating-type detecting principle and there occurs a problem concerning a position detecting function.

SUMMARY OF THE INVENTION

An object of the present invention is to provide, in compliance with the three-grating-type principle and, in particular, using the reflection-type construction, an encoder having a favorable gap characteristic, and to realize (1) miniaturization of an apparatus and (2) low power consumption that are the aforementioned technical problems.

Another object of the present invention is to provide, by realizing (1) and (2), an optical encoder that simultaneously satisfies various requirements such as the following: (3) to facilitate embedding into a device, (4) to be capable of performing high-resolution position detection, and (5) to perform high-accuracy position detection.

Still another object of the present invention is to provide, as means for solving the aforementioned problems, a reflection scale that improves light usage efficiency using a novel grating shape and to provide an optical arrangement that is optimum for the reflection scale.

Still further another object of the present invention is to provide a displacement measuring apparatus that is capable of detecting displacement information containing the moving direction of a moving body with high precision and at high resolution by obtaining a plurality of displacement signals having different phases, where overall simplification, miniaturization and reduction in power consumption of the apparatus is realized by utilizing the novel shape and pitch of the grating portion of the reflection scale and by appropriately setting arrangements and the like of the reflection scale, the light-emitting element of a light source, and a light-receiving element.

In the displacement measuring apparatus of the present invention, a scale having a reflecting function is arranged approximately parallel to a base on which a light-emitting element (or a light-emitting element array) and a light-receiving element (or a light-receiving element array) are mounted. The scale having the reflecting function has projection and depression portions that are arranged at constant periods in a displacement measuring direction. In addition, in respective projection and depression portions, continuous V-grooves are continuously arranged in a direction orthogonal to the displacement measuring direction (=micro roof mirror array, hereinafter abbreviated as the "MRA").

The displacement measuring apparatus of the present invention is characterized in that a light beam irradiated onto a scale from a light source and reflected by the MRA grating portion of the scale forms a grating image, whose pitch is twice as large as that of the grating of the scale, on a light-receiving element (or a light-receiving element array), and is received by a light-receiving means. Then, relative displacement information with reference to the scale in a parallel direction is detected using a signal from the light-receiving means.

(1-a) When the grating pitch of the projection and depression portions provided at the constant periods in the displacement direction of the scale is referred to as $P_1$, the segment pitch of the light-receiving element (or the light-receiving element array) is referred to as $P_2$, a space between the scale and the light-receiving element (or the light-receiving element array) is referred to as gP, a space between the scale and the light-emitting element (or the light-emitting element array) is referred to as gL, a center wavelength of an output peak value of a light flux from the light source or the wavelength of a center value obtained through integration of spectral distribution is referred to as $\lambda$, and a positive number is referred to as n, gaps are set in the optical encoder at gP and gP which are determined within a range of n<0.5 or within a range of 1.5<n<2.5 so that the following relations are satisfied:

$P_2=2P_1, gP=gL=2n(2P_1)^2/\lambda$ (→relations derived from the three-grating principle)

where gL and gP are each an air conversion optical path length.

(1-b) The light-emitting element is an LED having a current constricting structure and is composed of a light-emitting element array having at least one light-emitting region.

(1-c) When the light-emitting element array has a plurality of light-emitting regions, its arrangement pitch is set at $P_2$ and these light-emitting regions are arranged in a displacement measuring direction.

(1-d) The light-receiving means has at least one segment, with each segment being composed of a plurality of photodiodes (whose number is four) in order to achieve direction discrimination, signal stabilization, and high resolution, and the segment and photodiodes are arranged in the displacement measuring direction.

(1-e) The projection and depression portions are provided with continuous V-grooves arranged in a direction vertical to the displacement measuring direction, and the pitch of the continuous V-grooves is set at Pm.

(1-f) A reflected light beam from the continuous V-groove portion of the scale is converted into a one-dimensional or two-dimensional convergent light beam and is made incident on the light-receiving element.

(1-g) Displacement signals obtained from the array of a plurality of photodiodes as a result of a relative displacement in the parallel direction between the scale and the light-receiving (light-emitting) means have a phase difference of around 90° with reference to each other with regard to a relative displacement amount.

Other objects and constructions of the present invention will become apparent from the following description of preferred embodiments.

BRIEF DESCRIPTION OF THE DRAWINGS

FIGS. 12A, 12B and 12C are each a schematic drawing showing the shape of the main portion of an embodiment of a reflecting body of the present invention;

FIGS. 23A and 23B are each a schematic drawing showing the optical path of the reflecting body of the present invention;

FIGS. 24A, 24B and 24C are each a schematic drawing showing the optical path of the reflecting body of the present invention;

DETAILED DESCRIPTION OF THE PREFERRED EMBODIMENTS

First Embodiment

Figure 1A:
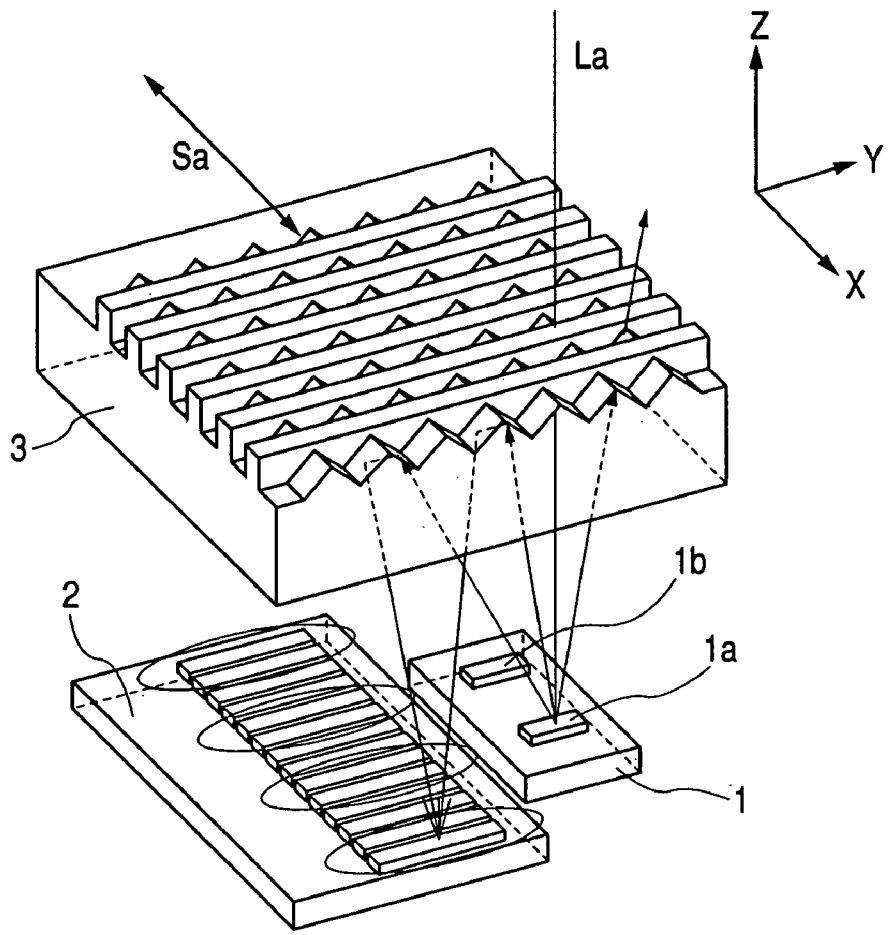
FIG. 1A is a schematic drawing of the main portion of an optical system of a first embodiment of the present invention.

FIG. 1A is a perspective view of the main portion of an optical system of a first embodiment that uses an optical-reflection-type linear scale of the present invention. First, there will be briefly described (1) a light source means and a light-receiving means and (2) a reflection scale in this order.

(1) Light Source Means, Light-Receiving Means

In this drawing, reference numeral 1 denotes a multi-point light emission LED of a current constricting type that functions as a light source means and is a light-emitting diode having a current constricting structure with which current is concentrated in a limited light-emitting region, reactive current is reduced, and there is taken out light. The light source 1 has a construction where a plurality of light-emitting regions are provided on a semiconductor substrate.

In this embodiment, there are provided two light-emitting regions that are a light-emitting region 1a and a light-emitting region 1b. The light source 1 radiates a light flux whose center wavelength of an output peak value (or the wavelength of a center value obtained through integration of spectral distribution) $\lambda_m$ is 0.65 μm. Reference symbol La denotes the center axis (light source optical axis) of a light beam radiated from the light-emitting region 1a of the light source 1.

Figure 1B:
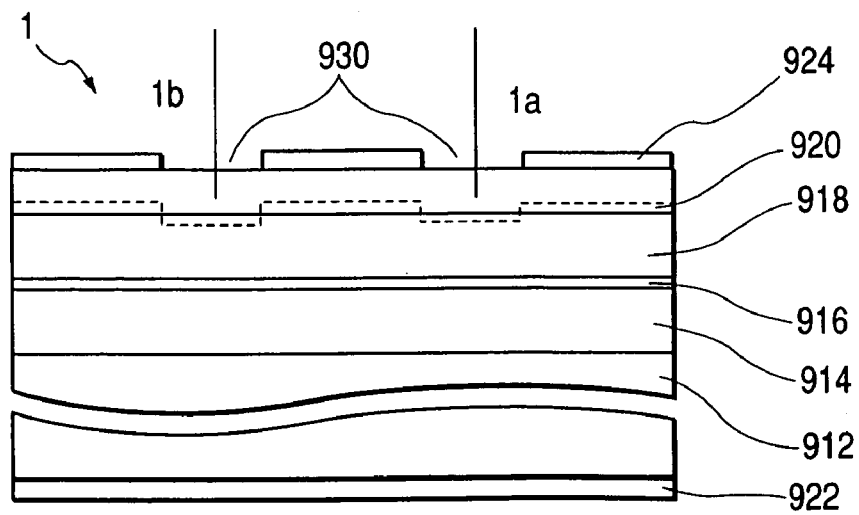
FIG. 1B is a simplified cross-sectional view of a light source means.

FIG. 1B is a cross-sectional view of the light-emitting diode 1 for explanation of the current constricting structure.

The light-emitting diode 1 is produced by forming a first cladding layer 914, an active layer 916, a second cladding layer 918, and a block layer 920 on a base 912 in this order through crystal growth, and then evaporating a lower portion electrode 922 and an upper portion electrode 924 on the lower surface of the base 912 and on the upper surface of the block layer 920, respectively. The base 912 is, for instance, a compound semiconductor having a thickness of around 150 to 250 μm. The current constricting structure is provided so that light generated within the active layer 916 by allowing an operating current to pass through within a predetermined region between the base 912 and the second cladding layer 918 is taken out from the second cladding layer 918 side.

In this drawing, a construction is also effective where a multi-layered reflecting film layer is provided in order to achieve high efficiency by guiding, to the second cladding layer side, light that is generated in the active layer 916 and traveling toward the bottom side of the base 912.

Figure 28:
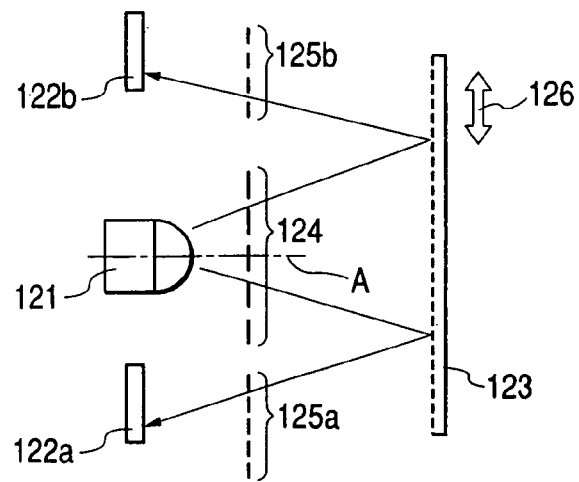
FIG. 28 is a schematic drawing showing the main portion of an optical system of a conventional displacement measuring apparatus.

As shown in this drawing, a plurality of LEDs having the current constricting structure are formed on a single semiconductor base and are used as an alternative to the light source 121 and the second scale 124 in FIG. 28 illustrating the prior art, which is means of the present invention for realizing miniaturization. On the other hand, as means for realizing low power consumption, this construction may be conceived as a light source means for converting electrical energy injected into the light source means into light and irradiating the light onto the first scale with the highest efficiency.

Meanwhile, an element given reference numeral 2 in FIGS. 1A and 1B is a semiconductor substrate on which there are mounted a photodiode array functioning as a light-receiving means, a signal processing circuit, and an electrical division circuit.

Figure 5:
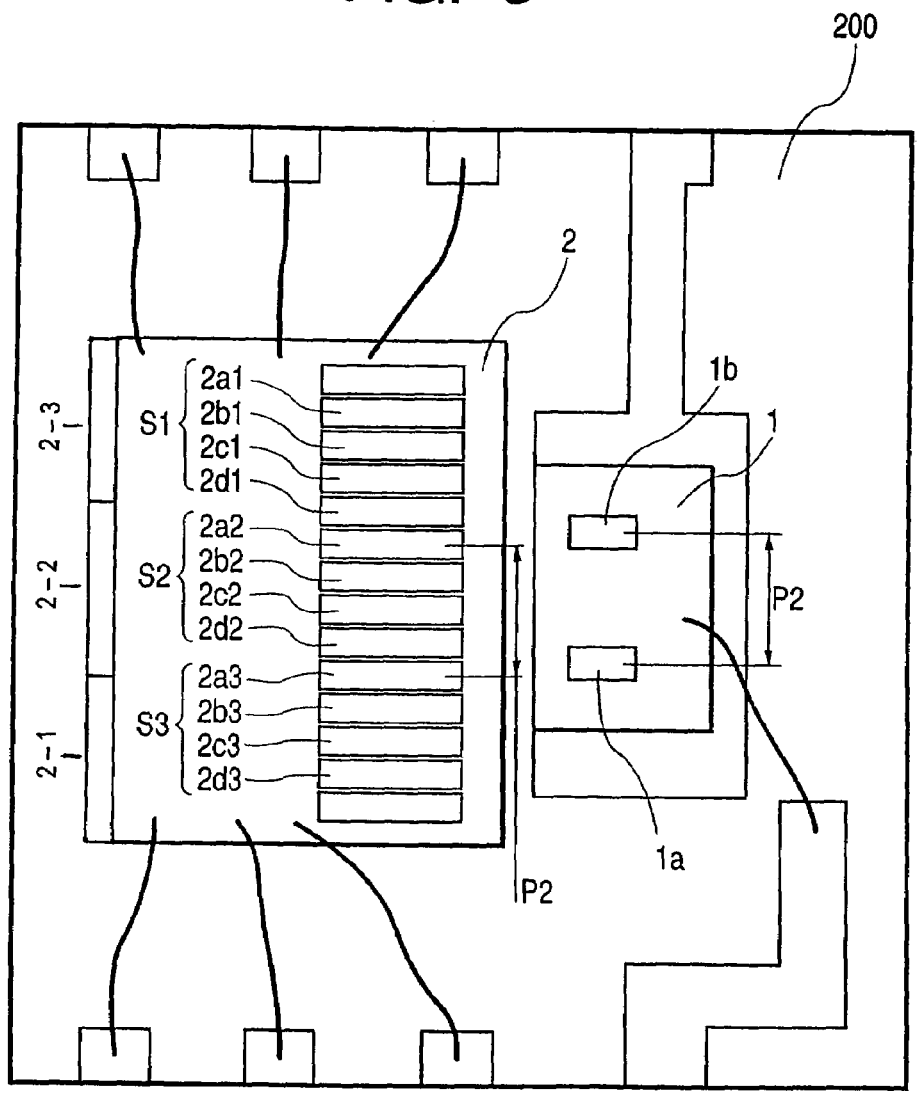
FIG. 5 shows a state where a light-emitting element portion and light-receiving elements in FIGS. 1A and 1B are mounted on the same substrate 200.

The light source means and the light-receiving means described above are mounted on the same glass epoxy substrate and are integrally constructed as shown in FIG. 5. The substrate as well as the light source means and the light-receiving means mounted thereon integrally and collectively constitute a light projecting and receiving unit (hereinafter referred to as the "detecting head").

Next, constructions of the light source means and the light-receiving means of this embodiment will be described with reference to FIG. 5.

In FIG. 5, a plurality of light-emitting regions and a photodiode array are arranged along a displacement measuring direction Sa of the reflection scale to be described later.

First, the light-emitting regions 1a and 1b of the light source are arranged with a pitch $P_2$ (=168 μm) that is twice as large as a shape pitch $P_1$ (=84 μm) of the reflection scale 3 for performing displacement detection.

On the other hand, as shown in FIG. 5, the photodiode array portion provided for the light-receiving means 2 is composed of three segments S1, S2, and S3, with the segment S1 being a collection of four light-receiving elements 2a1, 2b1, 2c1, and 2d1, the segment S2 being a collection of four light-receiving elements 2a2, 2b2, 2c2, and 2d2, and the segment S3 being a collection of four light-receiving elements 2a3, 2b3, 2c3, and 2d3.

As shown in FIG. 5, the elements 2a1, 2a2, and 2a3 are arranged with the pitch $P_2$ (=168 μm) that is twice as large as the shape pitch $P_1$ (=84 μm) of the reflection scale 3 for performing displacement detection, as is the case of the aforementioned light source arrangement pitch. Other elements are also arranged in a like manner, so that 12 light-receiving elements 2a1, 2b1, . . . , 2c3, and 2d3 (minimum light-receiving regions) each have a light-receiving width that is around ¼ of the pitch $P_2$.

Aside from these construction elements, the semiconductor base 2 that is the light-receiving means includes an amplifier 2-1 for amplifying signals from the photodiodes, a comparator 2—2 for performing binarization, an interpolating circuit 2-3 for realizing electrical division, a light intensity compensating circuit for stabilizing the intensity of light from the light source, and the like.

(2) Reflection Scale

Next, there will be described in detail the shape of the reflection scale that achieves an important function of the present invention.

The reflection scale 3 that achieves the important function of the present invention is produced using a substrate made of a translucent resin such as polymethylmethacrylate (PMMA), polycarbonate (PC), or preferably norbornene (PCPD)-based transparent heat-resistant resin "ARTON (trademark)" (having heat resistance corresponding to a heat deformation temperature of 170° C.). Projection and depression portions having a constant period (whose pitch $P_2$ is approximately equal to 84 μm) and continuous V-grooves (whose pitch Pmra is approximately equal to 100 μm) are formed on one surface thereof. Here, the reference symbol Sa in the drawing denotes the displacement measuring direction.

Figure 2:
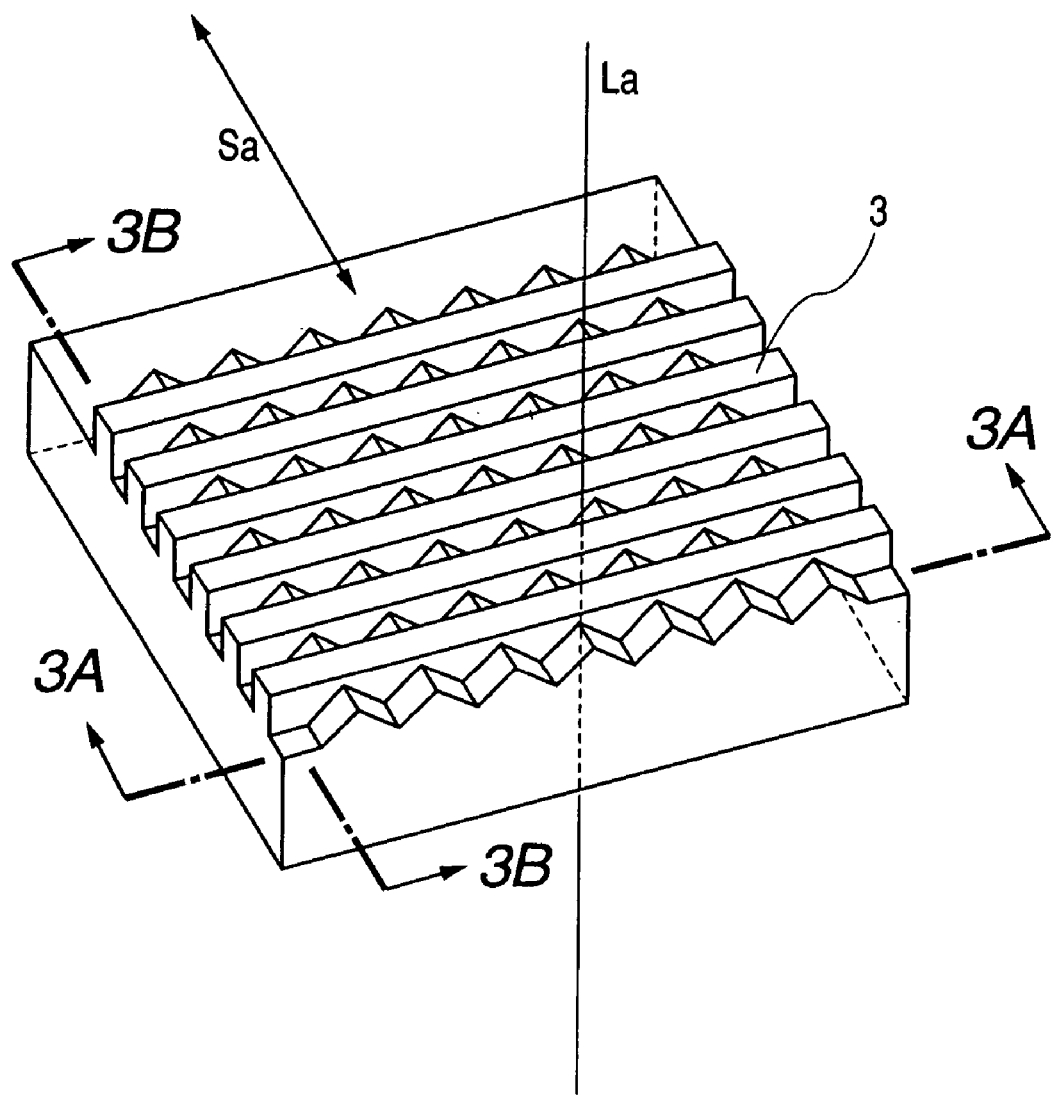
FIG. 2 is a perspective view of the main portion of a scale in FIGS. 1A and 1B.
Figure 3A:
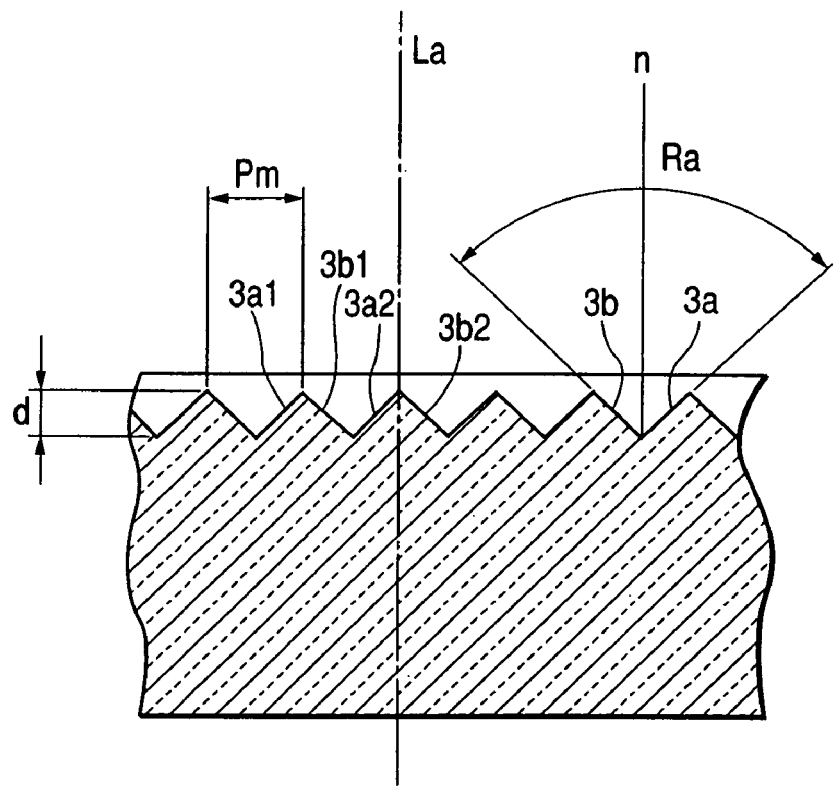
FIGS. 3A and 3B are each a cross-sectional view of the main portion of the scale in FIGS. 1A and 1B.
Figure 3B:
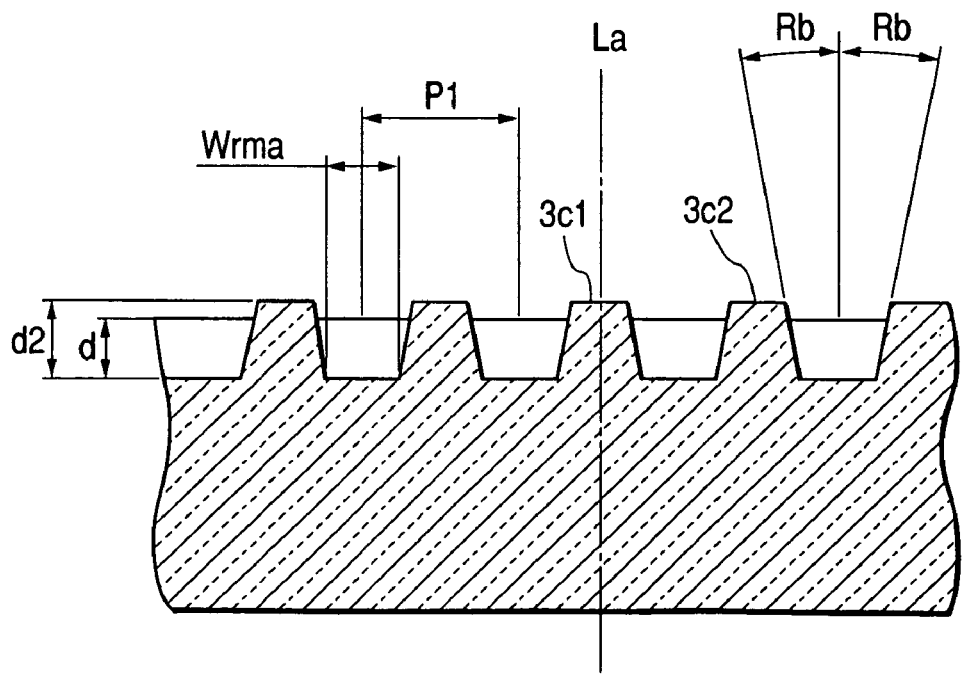

FIG. 2 is a perspective view of the projection and depression portions when viewed from a surface side of the reflection scale 3 on which there is formed the projection and depression portions, FIG. 3A is a Y-Z cross-sectional view of the reflection scale, and FIG. 3B is an X-Z cross-sectional view of the reflection scale.

In FIG. 3A, reference symbol La denotes a normal line standing from the light-emitting surface of the light-emitting region 1a of the light source 1, while reference symbol n indicates a line extending parallel to the normal line La.

A saw-shaped cross-sectional portion in this drawing corresponds to a portion of a micro roof mirror array (hereinafter referred to as the "MRA", this scale will be hereinafter referred to as the "MRA scale") that achieves the important function of the present invention, with this portion being composed of respective planes of inclined surface groups of two kinds " . . . , 3a1, 3b1, 3a2, 3b2, . . . " and an angle formed between two planes that are the inclined surfaces 3a and 3b is set at Ra. In this embodiment, the vertical angle Ra is set at around 95°. Also, the pitch Pm of the MRA is set at around 100 µm in this embodiment.

In FIG. 3B, the normal line on the surfaces 3c1 and 3c2 is parallel to the normal line La, the continuous V-groove group constituting the aforementioned MRA is arranged with the pitch $P_1$ as shown in this cross-sectional view, and the width Wmra in this cross section of the continuous V-groove group constituting the MRA is set at half the pitch $P_1$ of the MRA (Wmra is approximately equal to $\frac{1}{2} \cdot P_1$).

In this embodiment, it is possible to realize the MRA scale 3 with a manufacturing means such as a plastic injection Mo or the like, and an angle Rb in this cross-sectional view is approximately equal to the angle of the gradient of pulling-out from a metallic mold.

Figure 4:
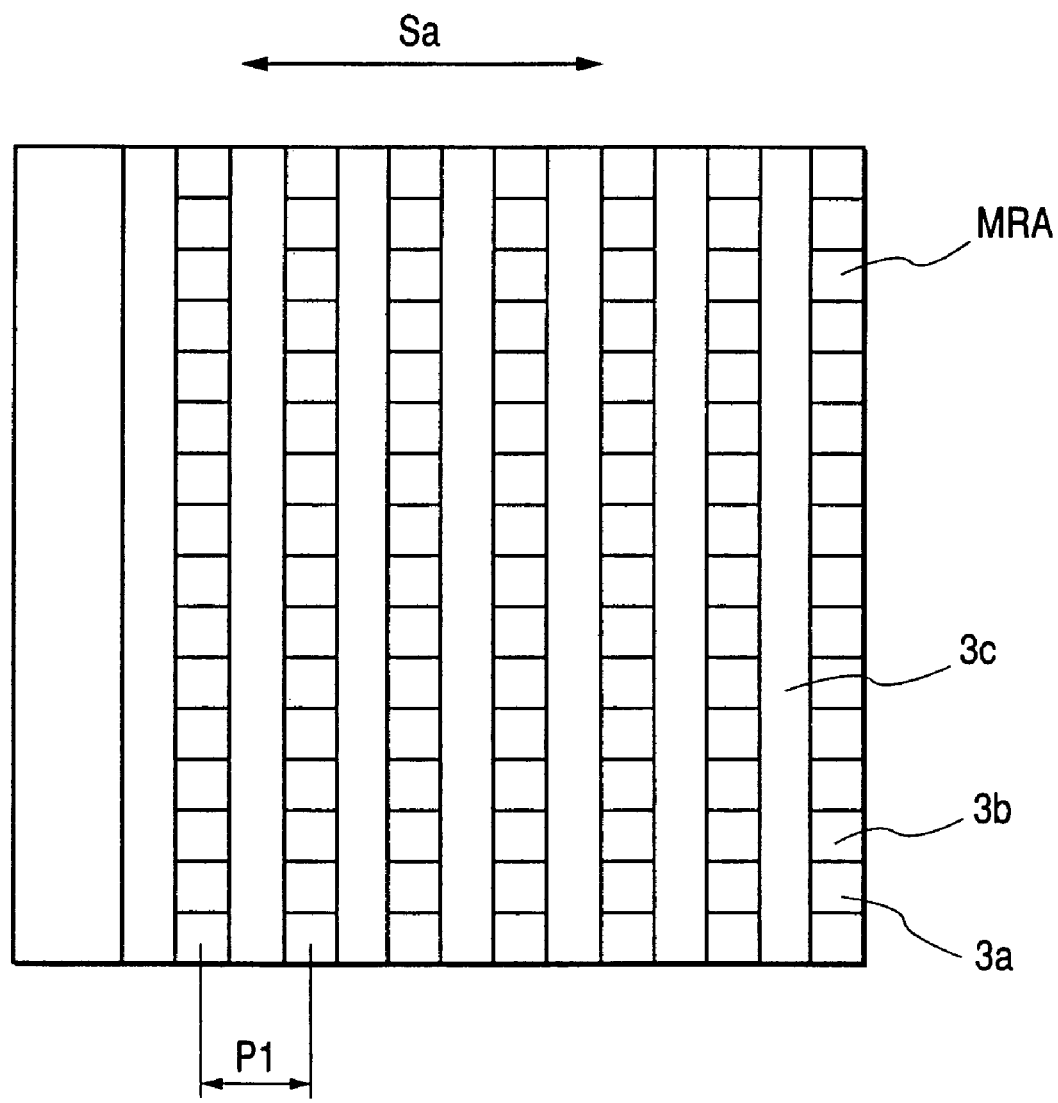
FIG. 4 is a plane view of the main portion of the scale in FIGS. 1A and 1B.

FIG. 4 is a schematic plane view of the MRA scale 3.

Here, the optical action of the reflecting body of the present invention will be first described through comparison with the conventional reflecting body shown in FIGS. 19A to 25C.

Figure 19A:
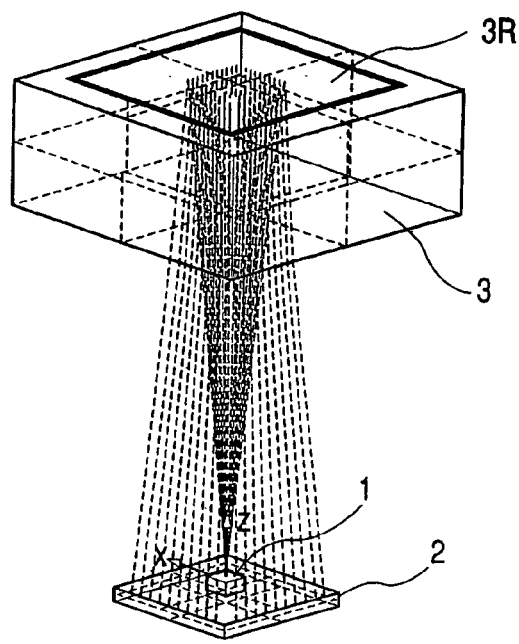
FIGS. 19A and 19B are each a schematic drawing showing the optical path of the conventional reflecting body.
Figure 19B:
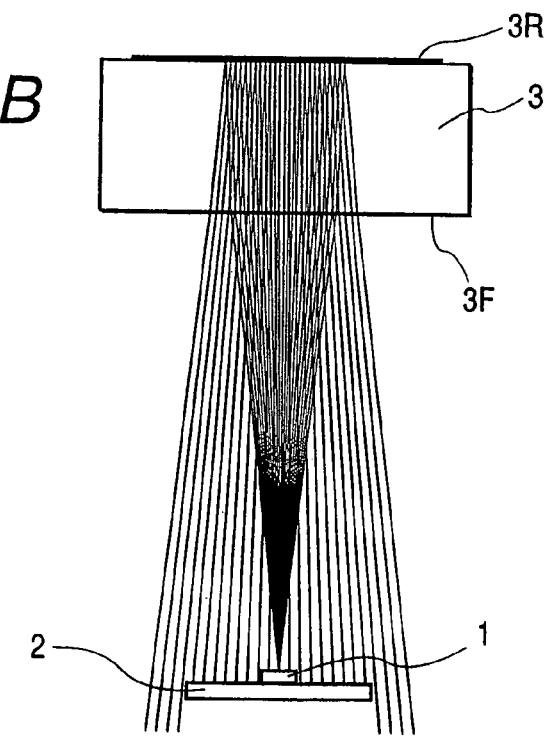

FIG. 19A is a perspective view of the conventional reflecting body, while FIG. 19B is a cross-sectional view thereof.

FIG. 19B shows a state where the a divergent light beam from a light source 1 is made incident on an incident surface 3F of a reflecting body 3, is reflected by a reflecting surface 3R composed of a plane, and is guided to a light-receiving portion 2 side while maintaining an angle of divergence of the light beam.

Figure 20A:
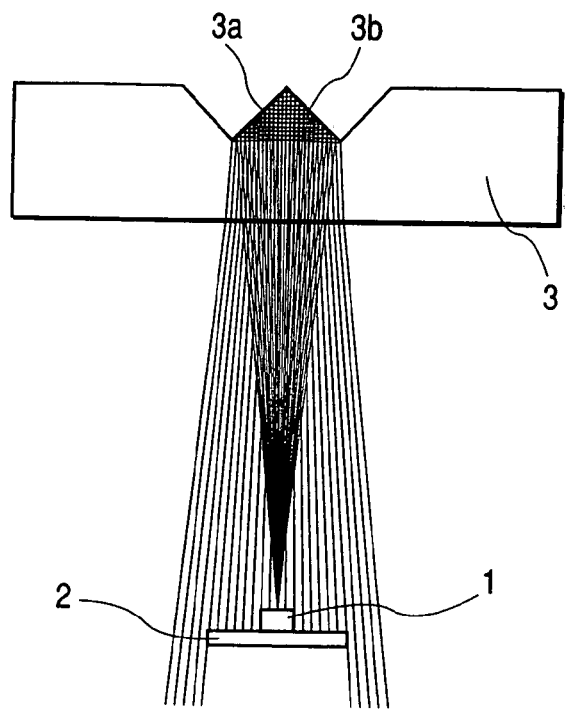
FIGS. 20A, 20B and 20C are each a schematic drawing showing the optical path of a reflecting body having two V-grooves.
Figure 20B:
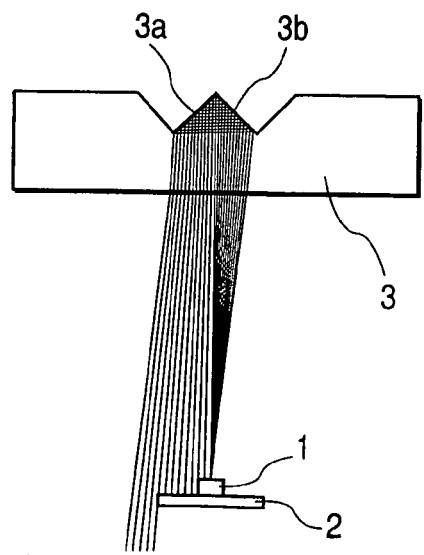
Figure 20C:
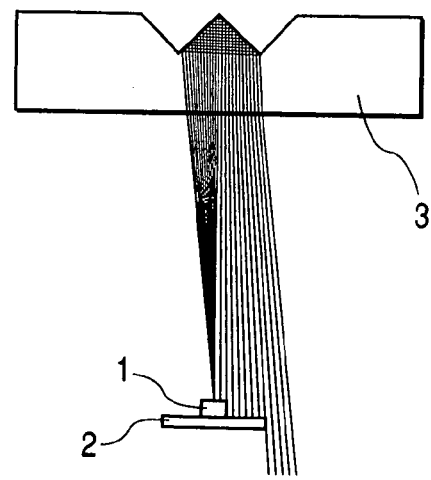

FIGS. 20A, 20B, and 20C each show an optical path in the case where a single roof mirror is used for the reflecting body 3.

FIGS. 20A to 20C each show a case where two reflecting surfaces 3a and 3b are arranged so that a light beam is reflected by a single roof mirror oppositely arranged with a predetermined angle.

In FIG. 20A, the light beam radiated from the light source 1 in all directions is guided to the light-receiving portion 2 side while maintaining the angle of divergence that is approximately equal to that shown in FIGS. 19A and 19B described above.

The divergent light beam from the light source 1 is divided by the two reflecting surfaces 3a and 3b and advances to the light-receiving portion 2 side without overlapping each other.

FIGS. 20B and 20C each show a state where the divergent light beam radiated from the light source 1 is divided into two light beams.

In FIGS. 20B and 20C, the divergent light beam radiated from the light source 1 toward the two inclined surfaces 3a and 3b is divided and separated by the two inclined surfaces 3a and 3b constituting the roof mirror.

For instance, in FIG. 20B, the light beam radiated to the right side from the light source 1 is guided to the left side of the light-receiving portion 2. The light beams divided and separated by the roof mirror travel to the light-receiving portion 2 side without overlapping each other.

In this case, the light beam made incident on the light-receiving surface has the same light intensity as that in the case of the conventional reflecting body 3 shown in FIGS. 19A and 19B.

Next, there will be described FIG. 21 that is an explanatory drawing showing the optical action of the reflecting body 3 of the present invention.

A reflecting means OE is provided on one surface of a transparent substrate 3e, with the reflecting means OE being produced by arranging, in a one-dimensional direction, a plurality of roof mirrors obtained by oppositely arranging two reflecting surfaces 3a and 3b at a predetermined angle.

A divergent light beam from a light source 1 is reflected by the reflecting means OE of the reflecting body 3 and reflected light beams are made to overlap each other at an arbitrary position (at a light-receiving portion 2 or a position in proximity thereto).

The divergent light beam from the light source 1 is approximately contained within the surface of the light-receiving portion 2. That is, the light beam emitted from the light source 1 with an angle of divergence is approximately contained within the surface of the light-receiving portion 2. As a result, there is increased the ray density of the light beam made incident on the surface of the light-receiving portion 2.

Figure 21:
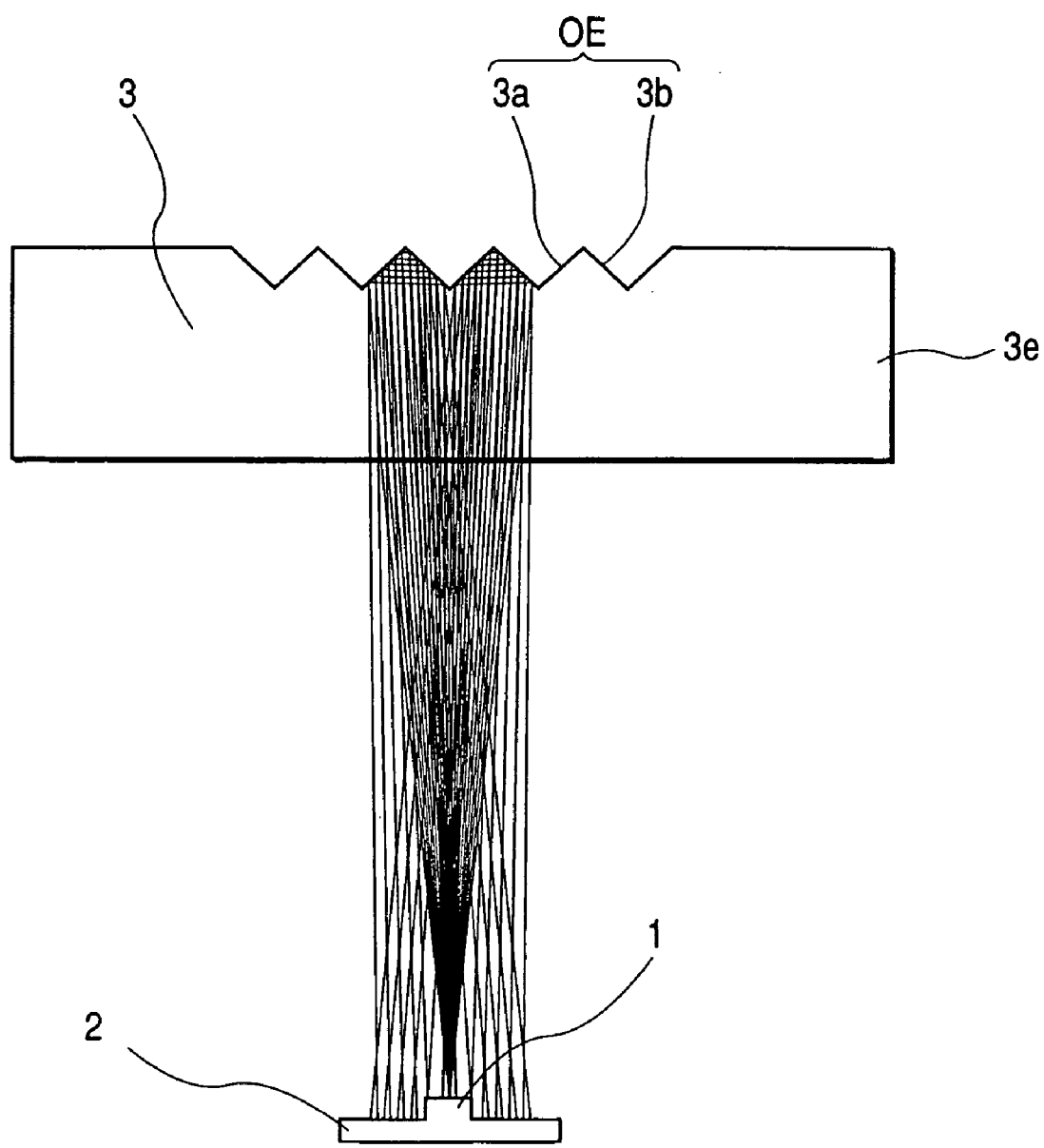
FIG. 21 is a schematic drawing showing the optical path of the reflecting body of the present invention.

Further, FIGS. 22A to 22D each show a state where the light beam from the light source 1 shown in FIG. 21 that is divergent in various directions is made incident on the reflecting body 3, the incident light beam is divided into a plurality of light beams by a plurality of roof mirrors, the plurality of light beams are reflected by the roof mirrors, and the light beams reflected by respective roof mirrors overlap each other at an arbitrary position (at the light-receiving portion 2 or a position in proximity thereto).

In either case, as to the reflected light from the reflecting body 3, its light beams overlap each other at the light-receiving portion 2 or the position in proximity thereto.

Figure 22A:
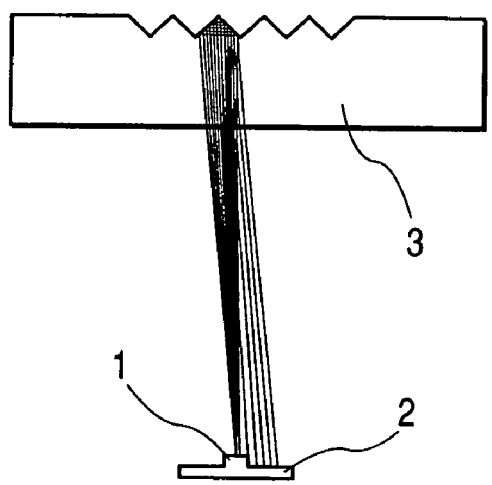
FIGS. 22A, 22B, 22C and 22D are each a schematic drawing showing the optical path of the reflecting body of the present invention.
Figure 22B:
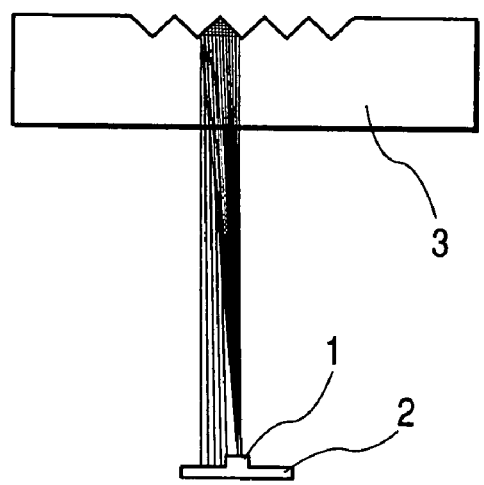
Figure 22C:
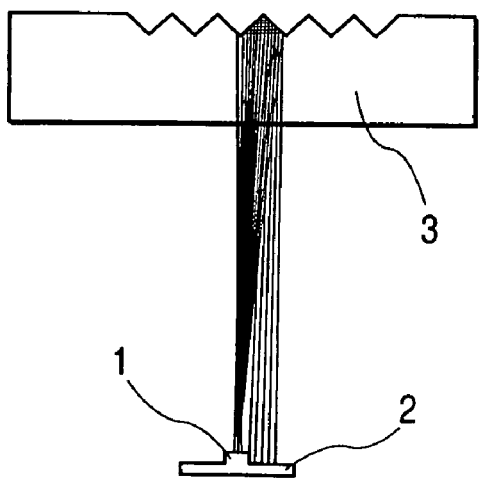
Figure 22D:
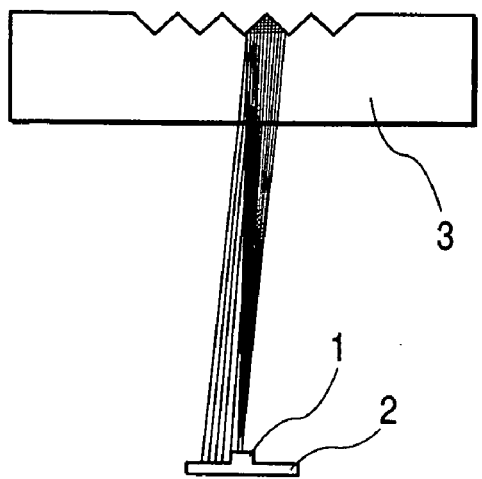

The light beam made incident on each inclined surface of the roof mirror is divided and separated, although the reflected light beams in FIGS. 22A and 22D overlap each other at the light-receiving surface 2 and the reflected light beams in FIGS. 22B and 22C overlap each other in the same region of the light-receiving surface 2.

From FIGS. 19A to 22D described above, it can be understood that the MRA scale converts a divergent light beam into a convergent light beam and guides the light beam to the light-receiving portion with efficiency.

FIGS. 23A and 23B illustrate a difference in ray action due to a difference in refractive index between materials of a translucent member serving as the substrate of the reflecting body 3.

FIG. 23A shows a case where the refractive index of the material of the translucent member 3e is 1.69, while FIG. 23B shows a case where the refractive index thereof is 1.53.

If the refractive index of the material is high, a critical angle becomes small, which alleviates a ray incident angle required for realizing total reflection. The reflecting body 3 of this embodiment uses a translucent member having a high refractive index (at least equal to 1.65), so that there is enhanced light usage efficiency.

FIGS. 24A to 24C and FIGS. 25A to 25C each show the condensing state of a reflected light beam that varies depending on the number of roof mirrors constituting the reflecting means.

In FIGS. 24A to 24C, with an increase in the number of the roof mirrors, an angle θr formed by the reflecting surfaces of inclined surfaces with reference to the light source 1 becomes small and, at the same time, the intensity of each light beam resulting from division is decreased, although the irradiation region on the light-receiving surface 2 of the reflected light beam guided to the light-receiving surface also becomes small.

It is possible to cancel out the decreasing amount of the light intensity by increasing the number of roof mirrors, so that the total light intensity is not changed and there is obtained only an effect of reducing the irradiation area of the light-receiving surface 2.

Figure 25A:
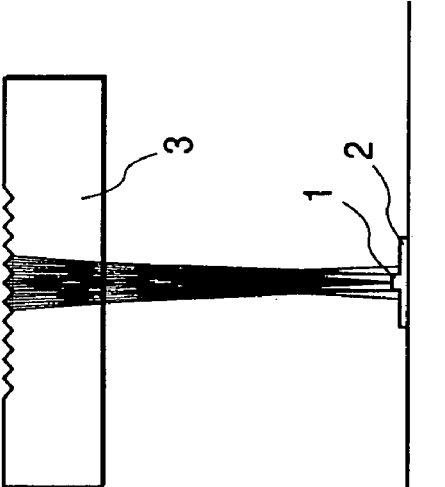
FIGS. 25A, 25B and 25C are each a schematic drawing showing the optical path of the reflecting body of the present invention.
Figure 25B:
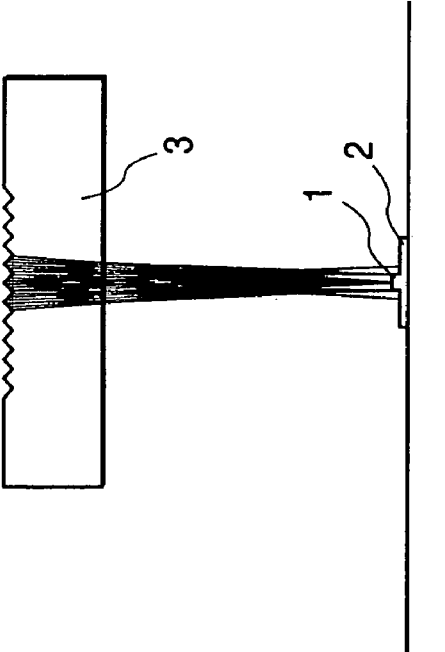
Figure 25C:
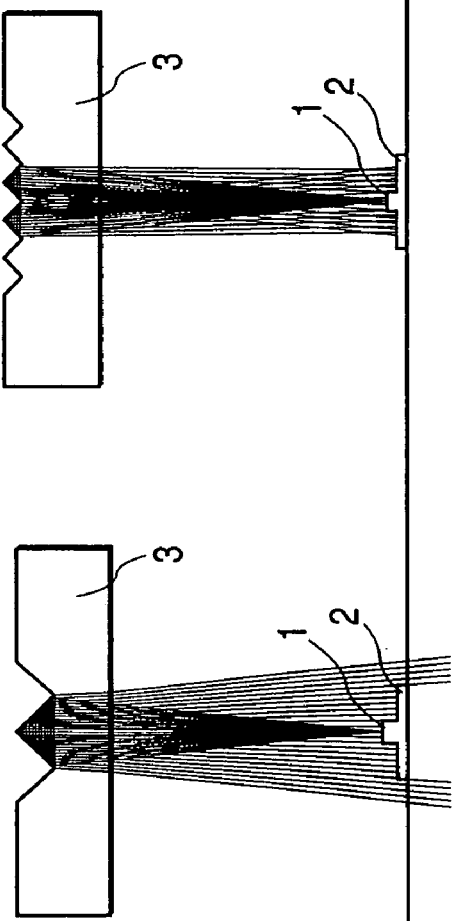

FIGS. 25A to 25C show a state where light beams emitted from the light source 1 at the same angle of divergence area made incident on the reflecting body 3 under a condition where there is set the same distance to the light source. As can be seen from FIGS. 25A to 25C, the ray density of a light beam guided onto the light-receiving surface 2 is increased in accordance with a reduction in pitch of the roof mirror.

The basic construction and operation of the reflecting body 3 of the present invention have been described above.

The construction, function, and operation of each of the light source means, the light-receiving means, and the reflecting means have been described above prior to the explanation of the first embodiment.

Now referring to FIGS. 1A and 1B again, an operation in the first embodiment will be described in more detail below.

In this embodiment, the aforementioned reflecting means 3 is a reflection-type linear scale. The reflecting surface thereof is realized by an MRA having a constant period (pitch $P_1$=84 μm), is provided for a moving body (not shown), and is movable in a direction indicated by an arrow Sa (moving direction). The reflecting surface of the reflection scale 3 is opposedly arranged so that a distance gP of around 1.5 to 2.5 mm is maintained with reference to the light-receiving element array 2. Note that the reflection scale 3 and the light-receiving element array 2 are arranged approximately parallel to the moving direction Sa.

Figure 6A:
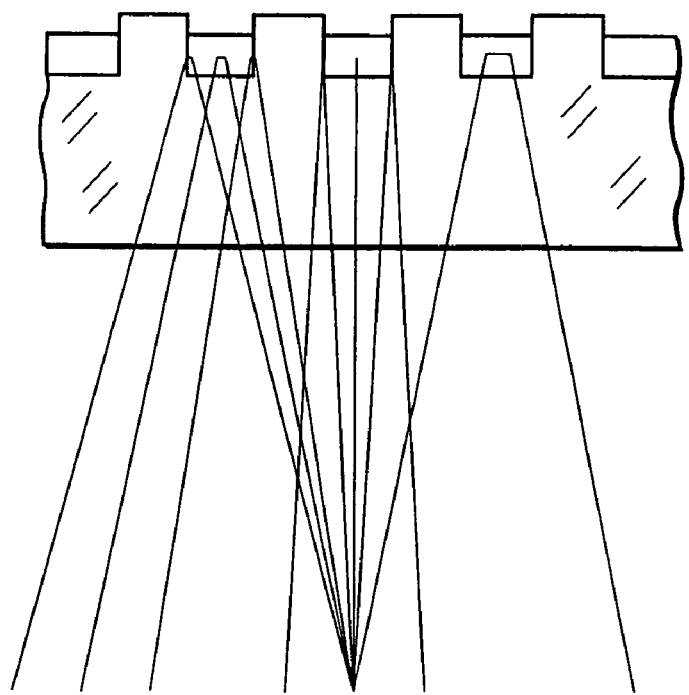
FIGS. 6A, 6B, 6C, 6D, 6E and 6F are each an explanatory drawing of the optical path of a reflecting means in FIGS. 1A and 1B.
Figure 6B:
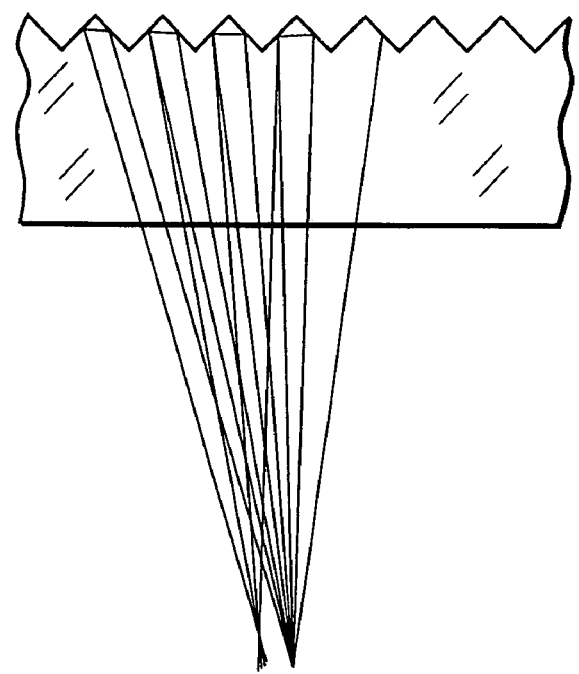

A divergent light beam emitted from the light source $1a$ is made incident on the reflecting surface of the MRA scale whose distance to the light source $1a$ is set at gL. FIGS. 6A and 6B are each an explanatory drawing of the optical path of each light beam made incident on the projection and depression portions (V-grooves $3a$ and $3b$ and the plane $3c$) of the MRA scale 3.

As shown in these drawings, a light beam made incident on the inclined surfaces $3a_1$ and $3b_1$ of the V-grooves at an angle that is at least equal to the critical angle repeats total reflection twice on the inclined surfaces $3a_1$ and $3b_1$, and then returns to the light source 1 side.

Also, the light beam made incident on the plane $3c$ passes through the MRA scale 3 as it is.

In a like manner, light beams made incident on other inclined surfaces $3a_2$, $3b_2$, $3a_3$, $3b_3$, and the like repeat total reflection twice, and then return to the light source 1 side.

Figure 6C:
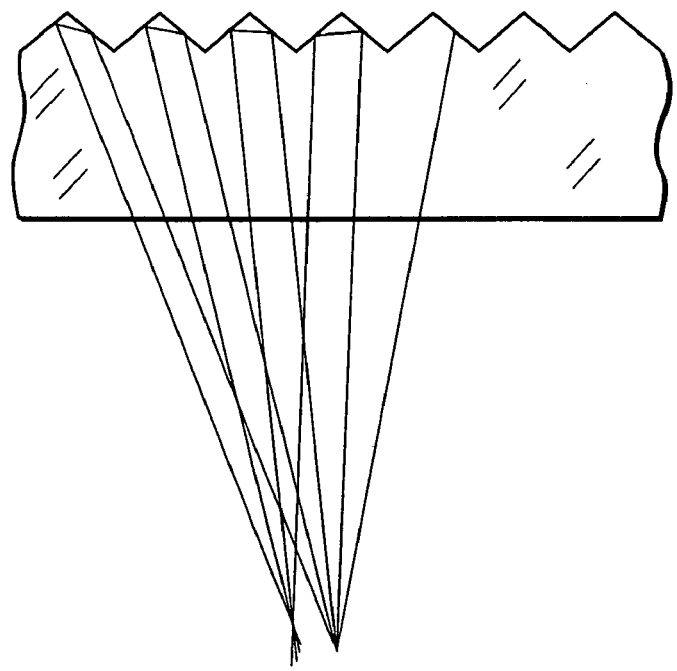
Figure 6D:
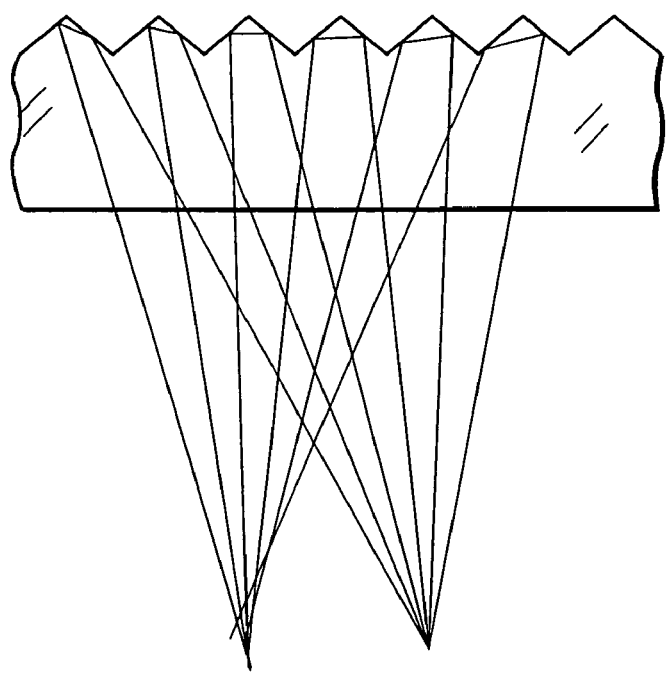

FIGS. 6C and 6D each show an optical path resulting from changing of the angle Ra between the two inclined surfaces forming each V-groove of the MRA scale. By changing this angle as appropriate, it becomes possible to guide a light beam to an arbitrary position with reference to the Y-axis direction on the photodiodes (see FIGS. 1A and 1B).

The divergent light beam from the light source $1b$ also behaves in a like manner and the light beam made incident on the micro roof mirror array is guided to the photodiodes.

Figure 6E:
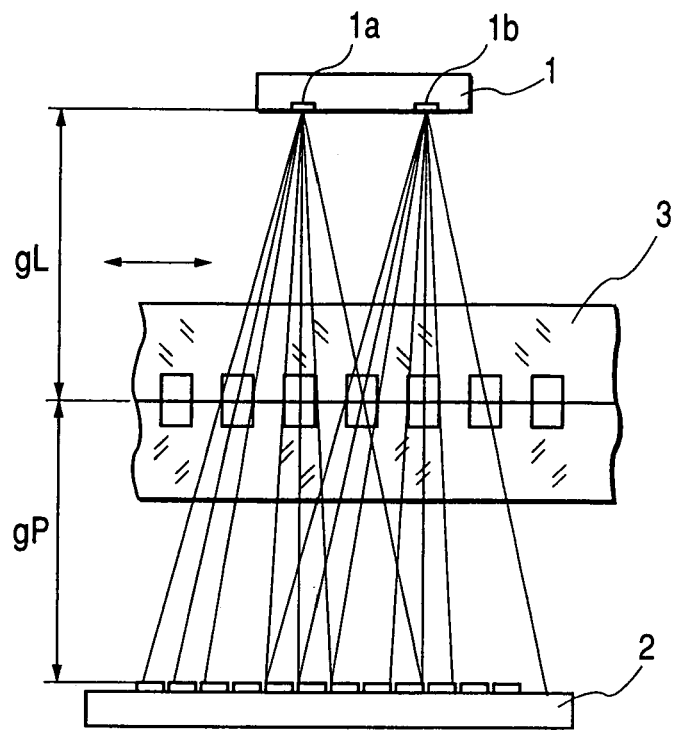
Figure 6F:
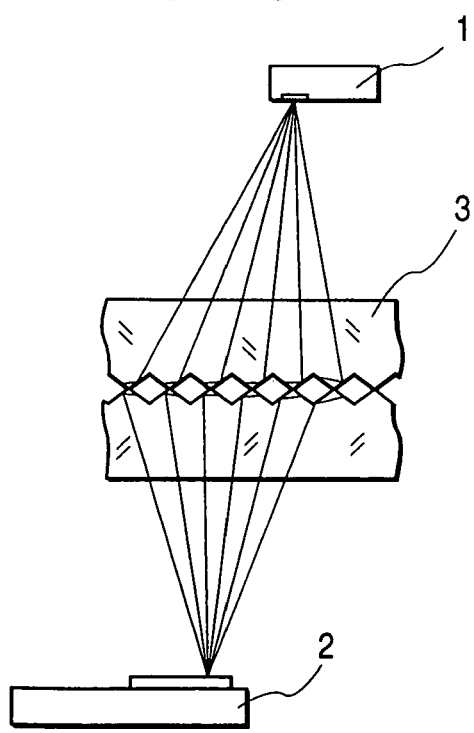

FIGS. 6E and 6F show equivalent optical systems for illustrating the optical action in FIGS. 6A and 6B in an easily understandable manner.

First, FIG. 6E shows an equivalent optical system when viewed form sides of the relative displacement of the MRA scale and the detecting head.

In this drawing, the light-emitting means 1 having a plurality of light-emitting bodies and the light-receiving means 2 including the photodiode array are respectively arranged at positions at which their distances to the MRA scale of the present invention become gL and gP, respectively.

Here, gL and gP each indicate an optical air conversion distance.

Figure 26:
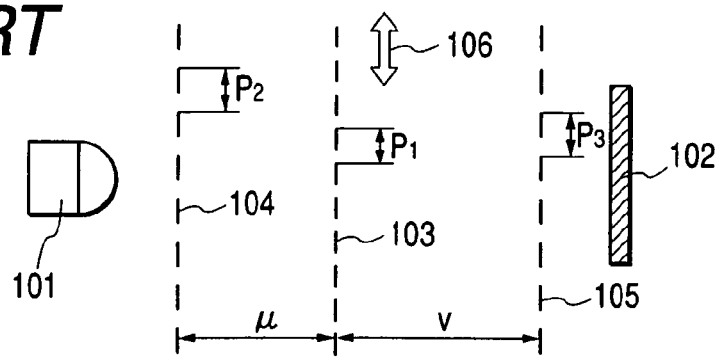
FIG. 26 is a schematic drawing showing the main portion of an optical system of a conventional displacement measuring apparatus.
Figure 27:
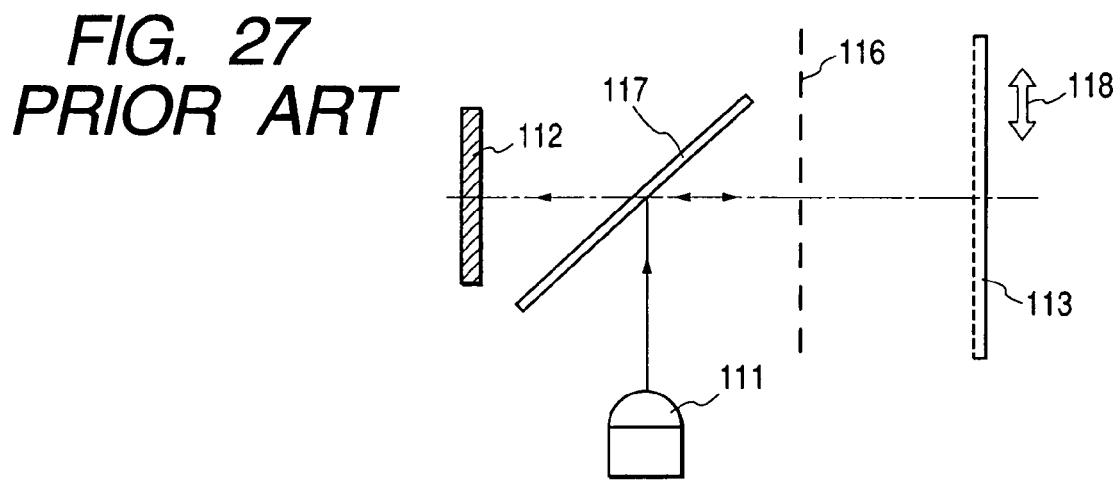
FIG. 27 is a schematic drawing showing the main portion of an optical system of a conventional displacement measuring apparatus.
Figure 29:
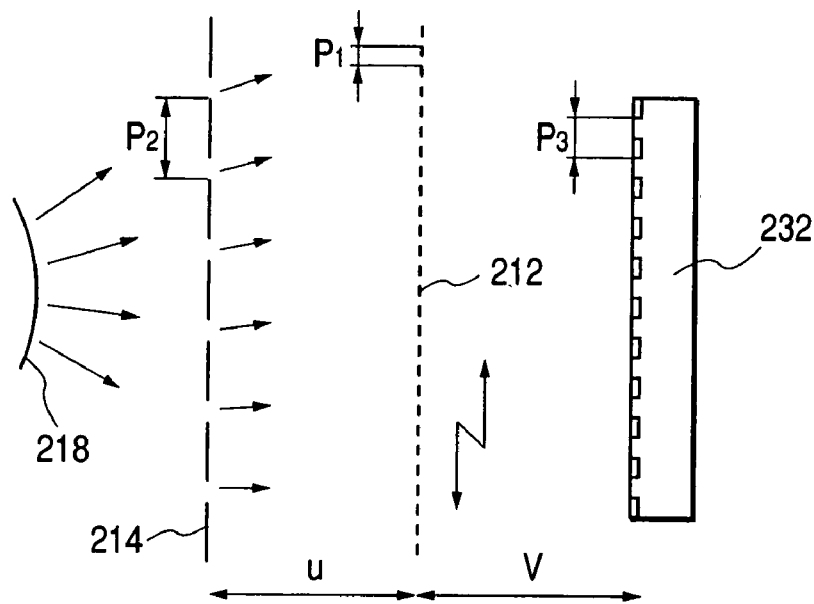
FIG. 29 is a schematic drawing showing the main portion of an optical system of a conventional displacement measuring apparatus.
Figure 30:
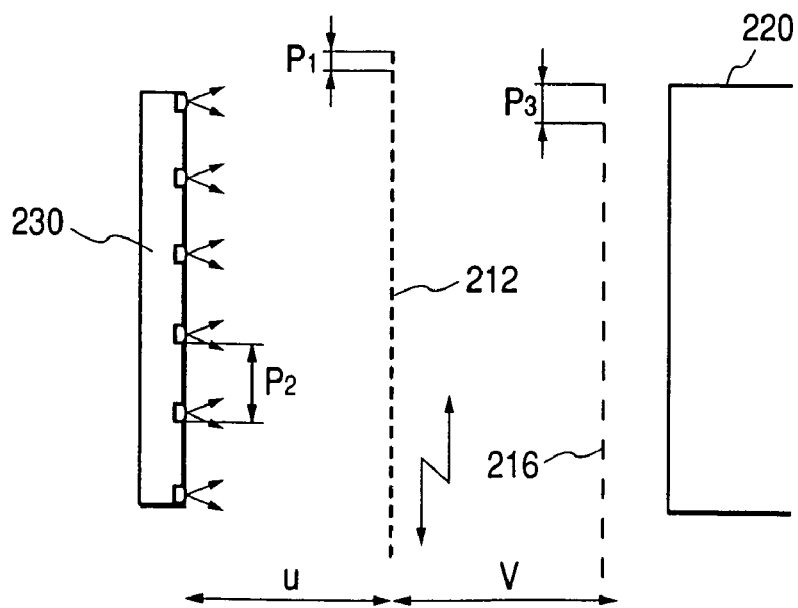
FIG. 30 is a schematic drawing showing the main portion of an optical system of a conventional displacement measuring apparatus.
Figure 31:
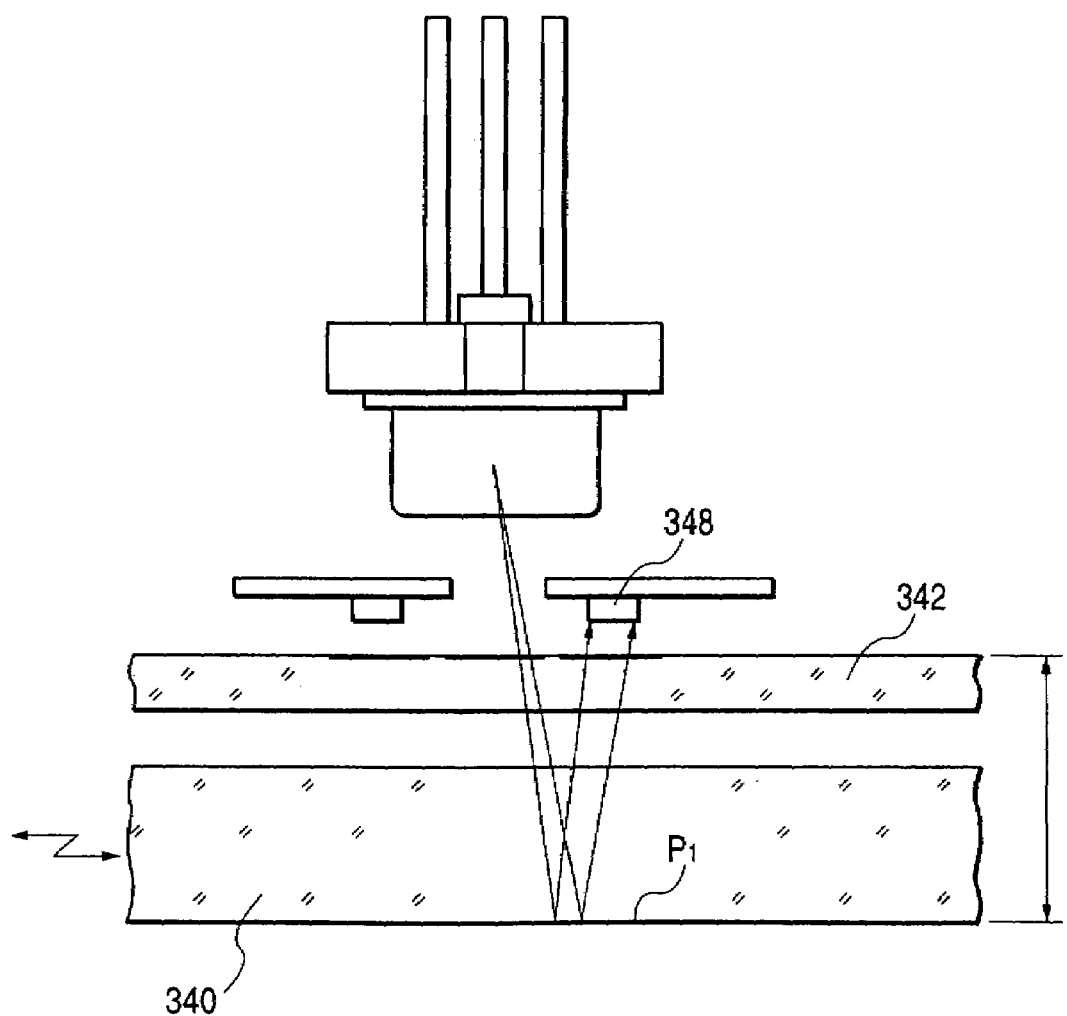
FIG. 31 is a schematic drawing showing the main portion of an optical system of a conventional displacement measuring apparatus.
Figure 32:
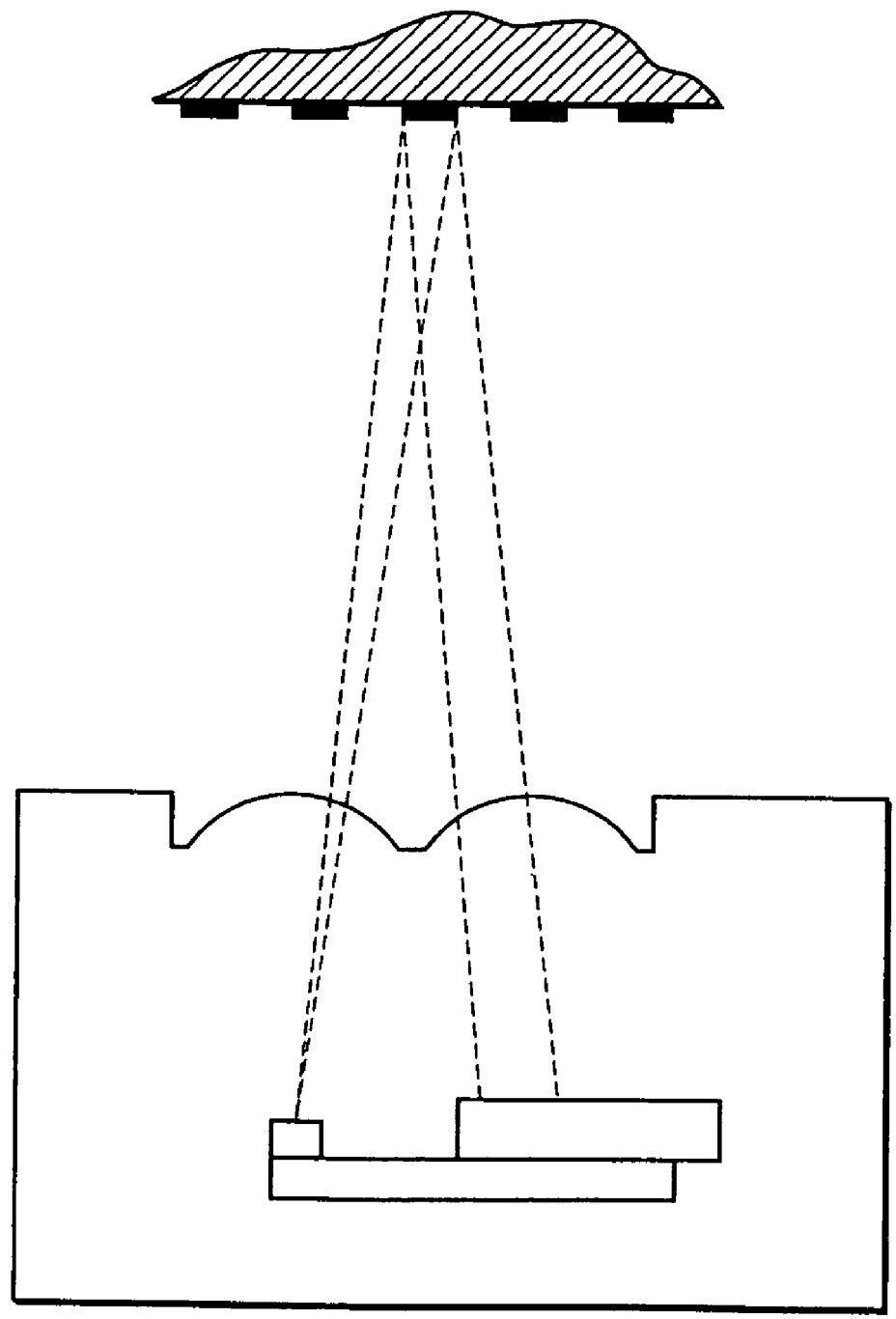
FIG. 32 is a schematic drawing showing the main portion of an optical system of a conventional displacement measuring apparatus.
Figure 33:
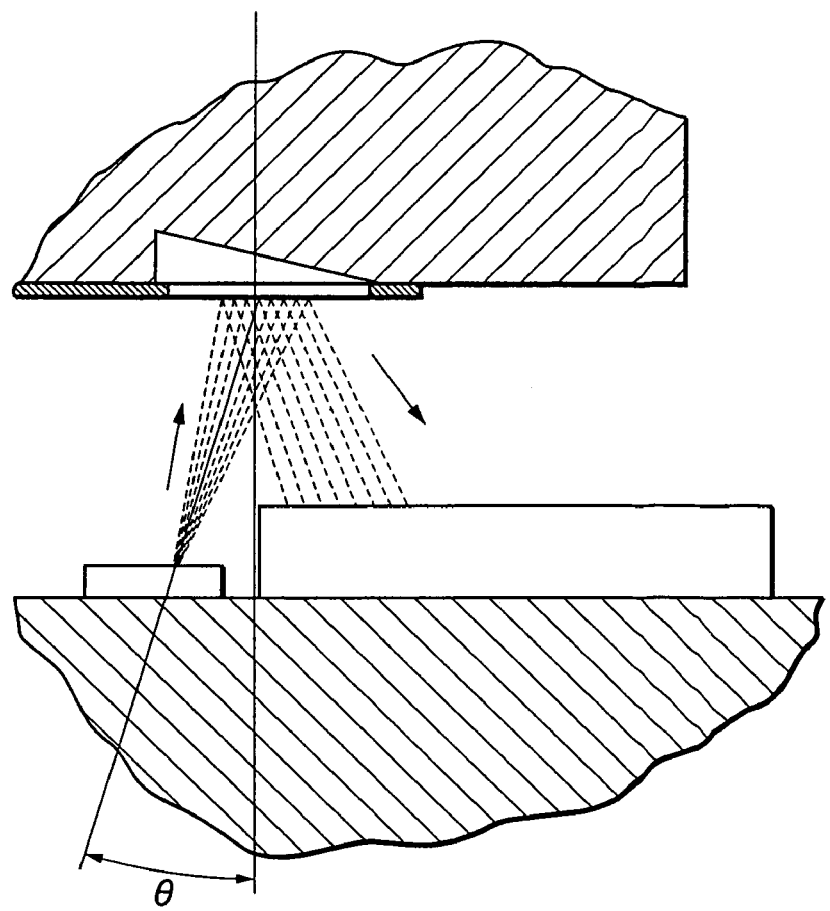
FIG. 33 is a schematic drawing showing the main portion of an optical system of a conventional displacement measuring apparatus.
Figure 34:
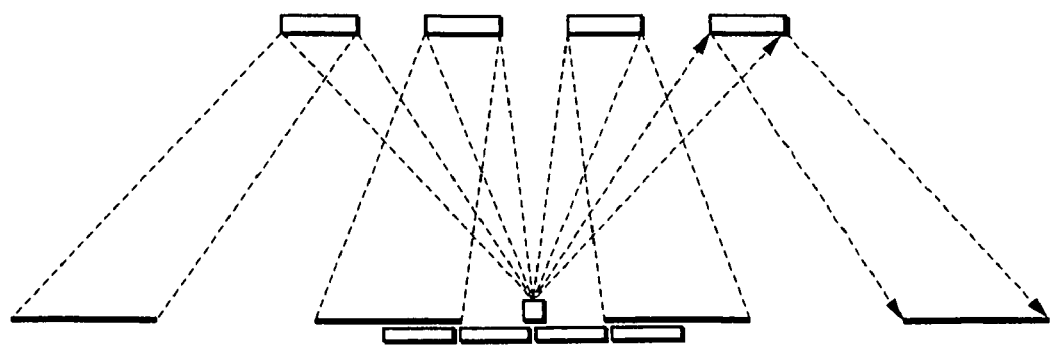
FIG. 34 is a schematic drawing showing the main portion of an optical system of a conventional displacement measuring apparatus.

It may be understood that the equivalent optical system in FIG. 6E has almost the same optical arrangement as in FIGS. 26, 29, or 30 illustrating the prior arts.

In the equivalent optical system in FIG. 6F, however, a divergent light beam from the light source means 1 is guided to the light-receiving means 2 as a convergent light beam, as can be seen from this drawing.

When compared with the conventional ray action of the three-grating type, in contrast to the conventional construction in which the divergent light beam emitted from the light source is guided to the light-receiving portion while maintaining the divergence as it is, the divergent light beam is converted into a convergent light beam and the convergent light beam is made incident on the light-receiving element in this embodiment. The substantial ray action of the convergent light beam has already been explained with reference to FIGS. 19A to 25C. This embodiment greatly differs from the conventional examples in this point.

As described above, in the first embodiment of the present invention, it is easily presumed that the usage efficiency of the light beam emitted from the light source is high in comparison with the conventional constructions.

Here, if the MRA scale 3 moves in the moving direction Sa, a grating image formed on the photodiode array portions S1 to S3 of the semiconductor base 2 also moves in the same direction along with the movement of the MRA scale.

As a result, bright portions and dark portions of the interference fringes based on the moving state of the MRA scale 3 periodically change and four displacement signals having different phases are outputted from the light-receiving means 2 ($2a$, $2b$, $2c$, $2d$) after photoelectric conversion.

In this embodiment, relative displacement information of the MRA scale 3 with reference to the detecting head including the semiconductor base 2 and the light-emitting element 1 is detected using the displacement signals obtained from the light-receiving means 2.

Next, there will be described a signal processing circuit portion in this embodiment.

In the optical system having the construction shown in FIGS. 1A and 1B, the light beam emitted from the light source means 1 generates a plurality of reflected and diffracted light beams along with the displacement of the MRA scale positioned midway through its optical path. At the same time, each reflected and diffracted light beam other than the zeroth-order diffracted light beam (direct light) is phase-modulated and forms a pattern of interference fringes that moves vertically on the semiconductor substrate 2 equipped with the photodiode array, the signal processing circuit, and the electrical division circuit. To be more specific, on the photodiode array, fringes having the light intensity distribution shown in FIGS. 7A and 7B move in a vertical direction in the drawings.

Figure 7A:
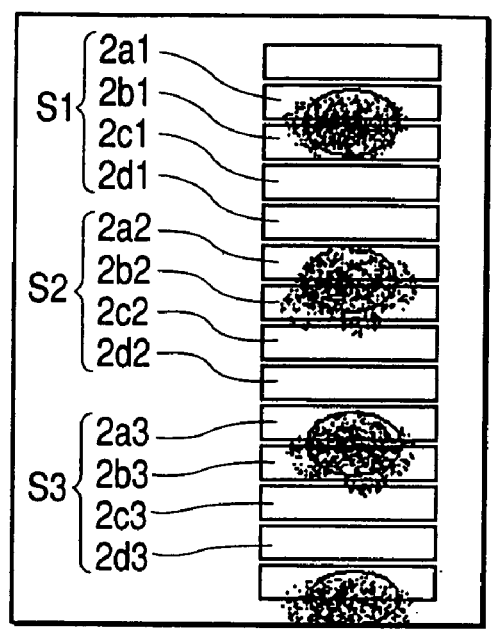
FIGS. 7A and 7B are each an explanatory drawing of a light-receiving means in FIGS. 1A and 1B.

FIG. 7A shows the semiconductor base 2 on which the photodiode array, the signal processing circuit, and the electrical division circuit are mounted.

With the construction in this embodiment, the photodiode array, the signal processing circuit, and the electrical division circuit are integrally provided, so that it becomes possible to obtain a high-resolution output signal while reducing the size of the semiconductor substrate.

FIG. 7A shows a relation between the photodiode array pattern of the optical encoder used in this embodiment and a detected light contrast pattern.

In FIG. 7A, photodiodes having a width of ¼ of the period of the bright and dark pattern are arranged so as to respectively have relations of 0°, 90°, 180°, and 270°. Also, light-receiving elements 2a1, 2b1, 2c1, 2d1, 2a2, 2b2, 2c2, 2d2, 2a3, 2b3, 2c3, and 2d3, whose number is 12 in total, are disposed as effective light-receiving elements, and one dummy photodiode is additionally arranged on each end portion thereof. These dummy photodiodes are provided in order to obtain a state where the light-receiving elements 2a1 and 2d3 positioned at both end portions of the effective portion have the same characteristics as other effective light-receiving elements in defiance of an influence of crosstalk received from their peripheral elements.

Figure 7B:
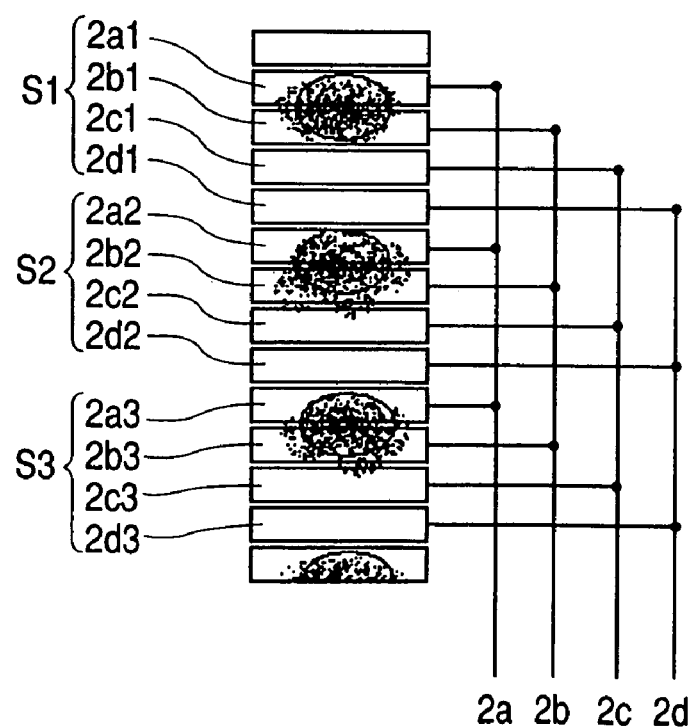

Also, each set of photodiodes having the same phase is electrically connected in the manner shown in FIG. 7B and generates one of output signals 2a, 2b, 2c, and 2d.

Figure 8:
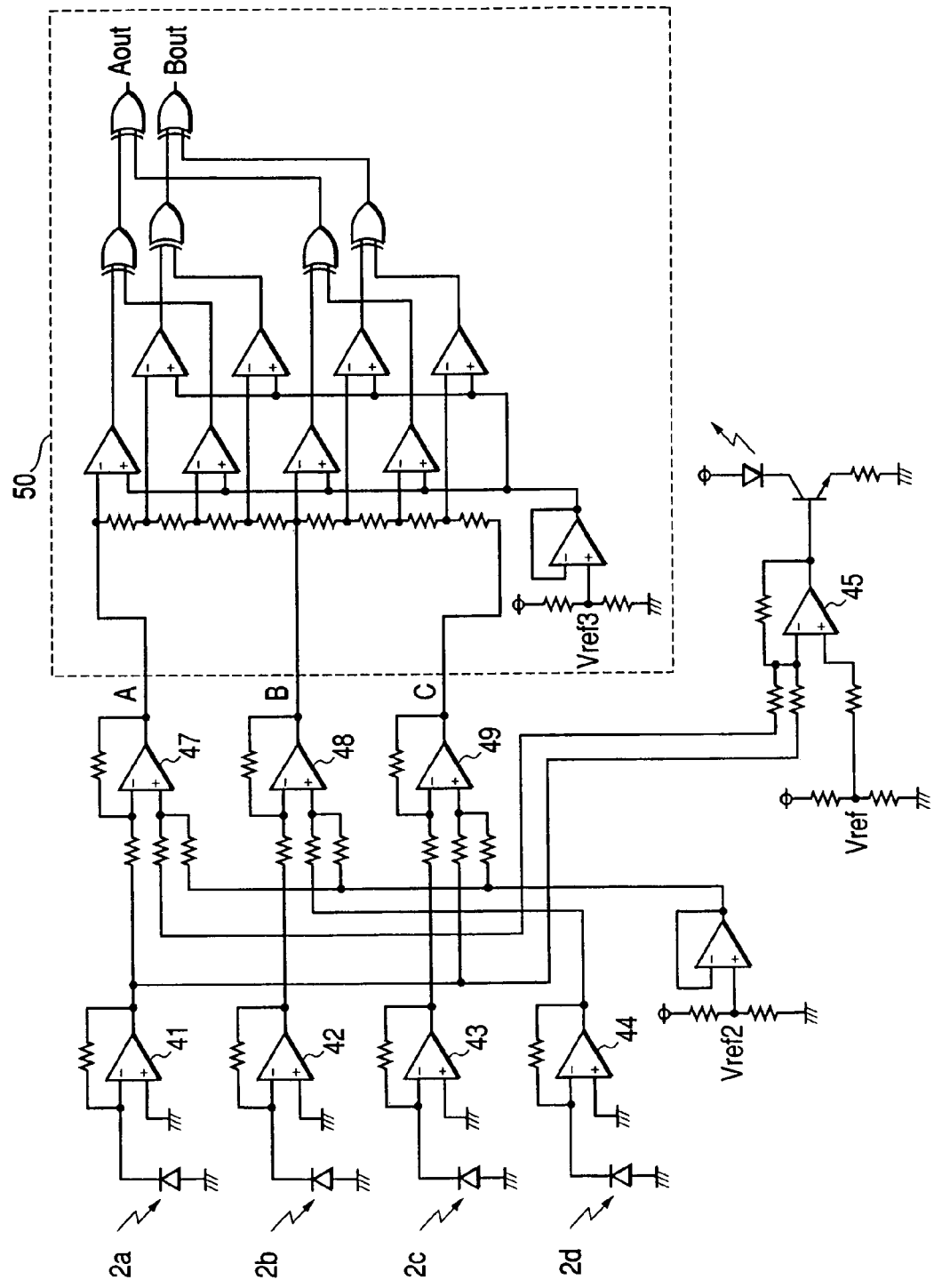
FIG. 8 is a circuit diagram of a signal processing circuit for processing a signal from a light-receiving element.

FIG. 8 shows a signal processing circuit that processes the signals obtained from the array of the 12 photodiodes described above. Reference numerals 41 to 44 denote amplifiers that I–V convert the signals 2a, 2b, 2c, and 2d that are each the sum of signals having the same phase generated by the photodiode array.

By superimposing a constant voltage (Vref2) on a differential amplification result of the signals 2c to 2a, there is obtained an output signal A. In a like manner, an output signal B is obtained from the signals 2d to 2b and an output signal C is obtained from the signals 2a to 2c. At this time, the output signals A, B, and C are given phase relations of 0°, 90°, and 180° and there is used the same DC voltage (verf2).

An AC voltage is also given as a detection voltage from a photodiode existing at almost the same position, so that respective levels become equal to each other and there is performed light intensity feedback control. As a result, there is obtained a constant amplitude where there is reduced an influence of fluctuations in light intensity and errors in attachment.

The center voltage is increased from zero to Vref2, which allows even a one power supply circuit to operate. Reference numeral 50 denotes the electrical division circuit. Note that signals from the differential amplifiers 47 to 49 are directly inputted into a resistance chain. Also, this electrical division circuit is constructed so as to operate even with one power supply.

As described above, there is a feature that even with a one power supply circuit construction, there is easily obtained an encoder including a high-accuracy electrical division circuit.

Figure 9:
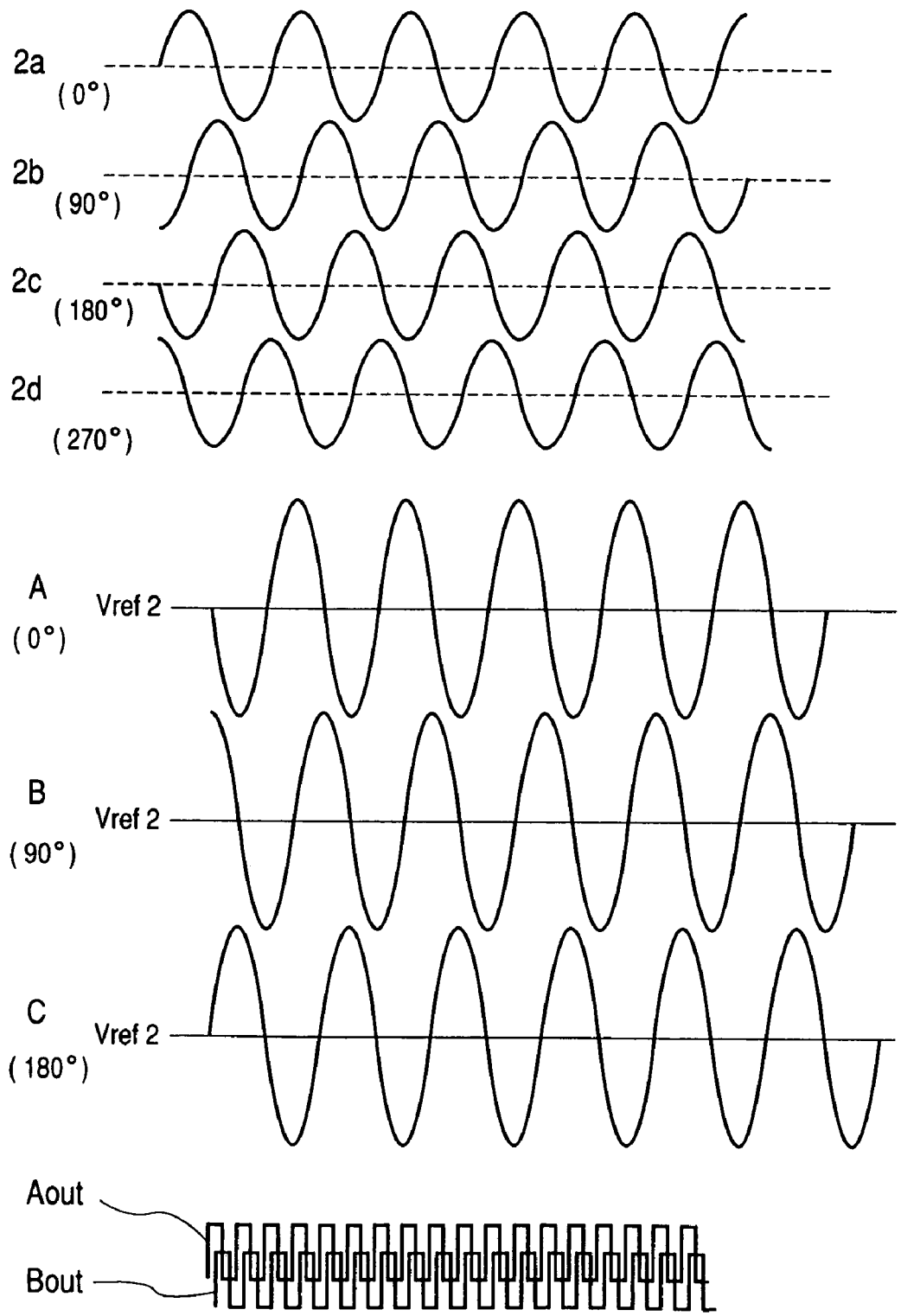
FIG. 9 shows an output signal from the light-receiving means in FIGS. 1A and 1B.

FIG. 9 shows an example of wavelengths of output signals of the I–V conversion circuits 41 to 44 in the case where a light contrast pattern moves on the photodiode array and there occurs fluctuations in light intensity. From the I–V conversion circuits 41, 42, 43, and 44, there are obtained similar signal waveforms although their phases differ from each other.

Reference numerals 2a and 2c denote signals whose phases are shifted from each other by 180°. With these signals, it is possible to obtain, from a result of addition of the signals 2a to 2c, a reference signal for performing feedback of the intensity of light emitted from the light source. Explanation of Characteristic of Gaps gL and gP Next, the principle of this first embodiment will be described through comparison with the principle of the conventional three-grating reflection type.

Like in the above description, the MRA reflection scale 3 possesses a function of converting a divergent light beam into a convergent light beam that has been unattainable by the conventional reflection-type scale.

On the other hand, a light transmission portion (corresponding to 3c) and light reflecting portions (corresponding to $3a_n$, $3b_n$) are provided at constant periods, so that there is realized the same optical action as a diffraction grating of an amplitude type, as is the case of the conventional reflection-type optical scale. As a result, there is exhibited a diffraction interference phenomenon in compliance with the three-grating-type optical principle that is known in the prior art.

From the known properties expressed by Expressions (1) to (5), the following relational expression holds true in the case of the reflection-type construction in this embodiment.

$$P_2 = 2P_1, \; gP = gL = 2nP_1^2/\lambda \tag{6}$$

where $P_1$ is the pitch of the MRA scale, $P_2$ is the arrangement pitch of the array-shaped light source/the pitch between the segments (S1, S2, and S3) of the photodiode array, and gL and gP are each an air conversion optical path length.

From the relation described above, a light beam emitted from the light source means and reflected, diffracted, and interfered by the MRA reflection scale 3 forms a grating image (diffracted and interfered image) on the photodiode portions S1 to S3 of the semiconductor base 2, with the grating image being determined by the grating pitch $P_1$ of the MRA scale, the arrangement intervals $P_2$ between the plurality of light-emitting regions, and the luminescence center wavelength λ of the light source.

The pitch of the grating image is $P_2$ (approximately equal to 168 μm) and exhibits a value that is twice as great as $P_1$, and the segment pitch of the light-receiving means is set at $P_2$ and overlaps the pitch $P_2$ of the grating image.

According to the techniques proposed in Japanese Patent Publication No. 60-23282, Japanese Utility Model Application Laid-Open No. 1-180615, and the like described above, the value of "n" in aforementioned Expression (6) is set at a positive number and it is insisted that the gaps should be set in proximity to this value.

In this first embodiment, however, the arrangement is determined in accordance with Relational Expression (6) that is a conditional expression, so that the above conventional opinion does not hold true from a practical viewpoint.

Here, calculation will be made by concretely assuming important numerical values in this embodiment. In the following description, it is assumed that $P_1$ that is the pitch of the MRA scale is approximately equal to 84 μm, $P_2$ that is the arrangement pitch of the array-shaped light source/the pitch between the segments (S1, S2, and S3) of the photodiode array is approximately equal to 168 μm, λ that is the center value of the luminescence wavelength of the light source is approximately equal to 0.65 μm, and n is a positive number. Under this condition, a gap V(=U), with which an optimum interference fringe contrast is obtained through air conversion, becomes as follows from the disclosed relational expression.

(I) In the case of n=1

$$U = V = 2nP_1^2/\lambda$$
$$= 2 \times (84 \times 84 \div 0.65)$$
$$\approx 21{,}711 \ \mu m$$

(II) In the case of n=2

$$U = V = 2nP_1^2/\lambda$$
$$= 2 \times (84 \times 2 \times 84 \div 0.65)$$
$$\approx 43{,}421 \ \mu m$$

Figure 10A:
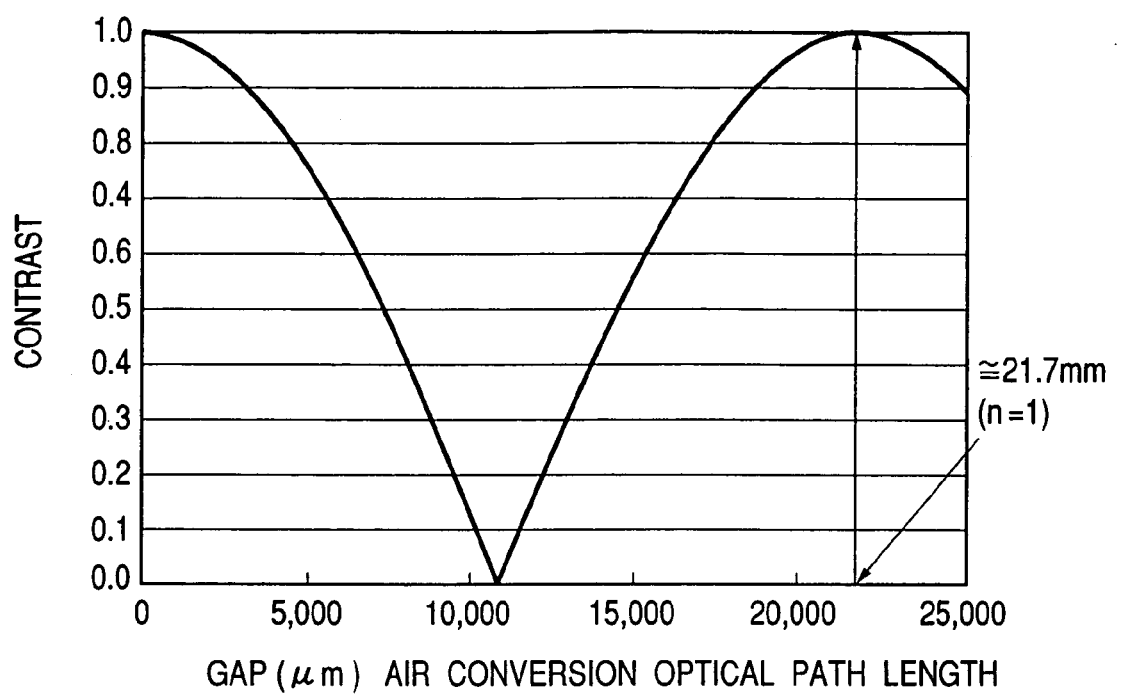
FIGS. 10A, 10B, 10C, 10D, 10E and 10F are each an explanatory drawing of a gap characteristic in the embodiment shown in FIGS. 1A and 1B.

It has conventionally been considered that in accordance with the three-grating-type principle and Conditional Expression (6) that determines arrangements of the reflection scale, the light source means, the light-receiving means, and the like, high-contrast interference fringes are obtained at a position of around 21.7 mm or 43.4 mm and there is exhibited a contrast characteristic shown in FIG. 10A that varies in accordance with changing of the gaps.

In reality, however, when there is performed arrangement using these sizes, no practical signal is obtained. That is, at the position of around 21.7 mm or 43.4 mm, a distance between the light source means 1 and the MRA reflection scale 3 is too long, so that there occurs a shortage of intensity of light made incident on the light-receiving means and therefore no effective signal amplitude is obtained, which means that the above conventional opinion does not hold true.

Figure 10B:
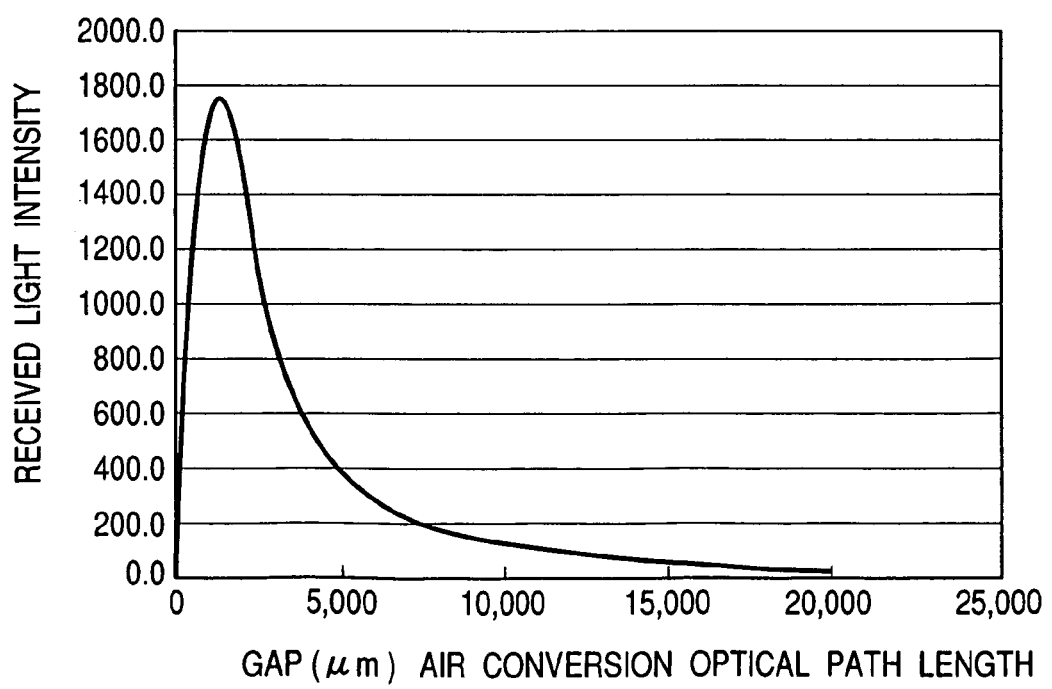

FIG. 10B shows a relation between the received light intensity and the gaps. In this drawing, the peak of the received light intensity is exhibited at a position of around 2 mm and it is scarcely possible to secure a practical light intensity with a distance of 5 mm or longer.

As described above, in the case of the reflection type, when the detecting head and the reflection scale are separated from each other by at least a certain distance, there occurs a problem concerning an extreme shortage of light intensity. As a result, it is impossible to obtain any effective signal at the gap position of 21.7 mm determined from aforementioned Conditional Expression (6) related to the three-grating reflection type.

Therefore, in this case, it is effective that the gap is set at a position where n<0.5 in the graph shown in FIG. 10A.

Please replace the paragraph beginning at line 27 of page 46 through line 15 of page 47 with the following amended paragraph:

As described above, it has conventionally been considered that it is preferable to arrange a reflection scale at a position at which there is satisfied the relation expressed by Conditional Expression (6) in the case of the reflection-type construction in compliance with the three-grating-type displacement detecting principle. In this first embodiment, however, it is effective to arrange the reflection scale within a range of n<0.5 (although "n" is assumed as a positive number in Conditional Expression (6)). In this case, it is possible to say that the arrangement of the reflection scale at the peak position of the received light intensity is more preferable than that at the position determined with reference to the relation expressed by Conditional Expression (6).

Second Embodiment

A second embodiment differs from the first embodiment described above only in a size relation in a manner described below.

In this second embodiment, only $P_1$ and $P_2$ are changed and other sizes are completely the same as those in the first embodiment.

It is assumed that $P_1$ that is the pitch of the MRA scale is approximately equal to 42 μm, while $P_2$ that is the arrangement pitch of the array-shaped light source/the pitch between the segments (S1, S2, and S3) of the photodiode array is approximately equal to 84 μm.

Here, a preferable gap setting position will be calculated by concretely assuming important numerical values in the second embodiment, as is the case of the first embodiment described above.

From the disclosed relational expression, the gap V(=U), with which an optimum interference fringe contrast is obtained through air conversion, becomes as follows when n that is a positive number is set at "0.5<n<1.5".

$$U = 2nP_1^2/\lambda$$
$$= 2 \times (42 \times 42 \div 0.65)$$
$$\approx 5{,}428 \ \mu m$$

Figure 10C:
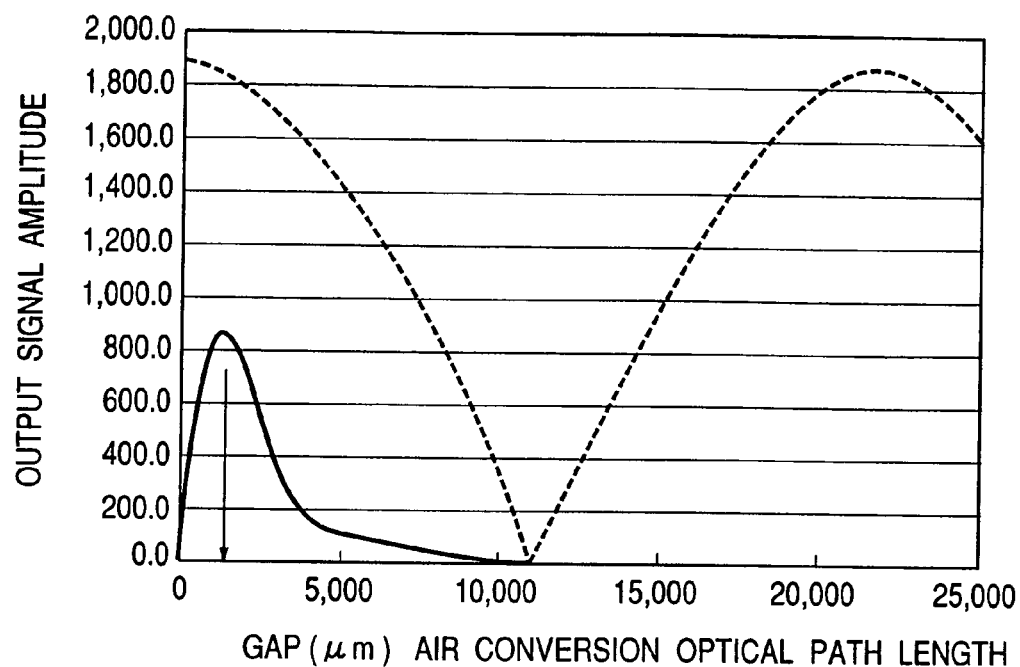
Figure 10D:
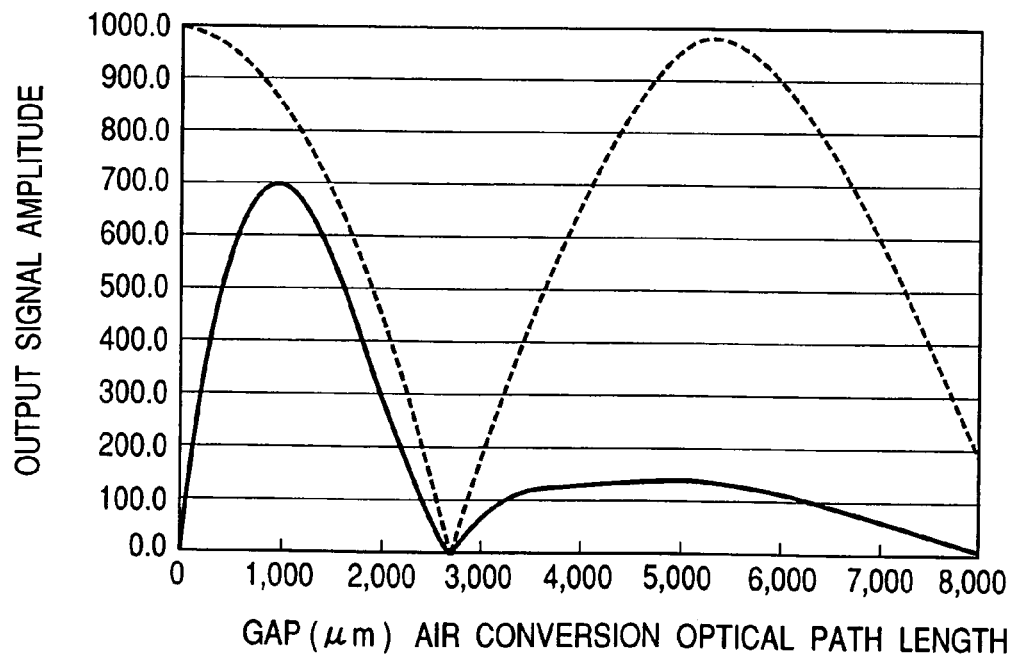

FIG. 10D shows results of experiments conducted in the second embodiment.

At the position of 5.4 mm, the received light intensity becomes very low. In this embodiment, as is the case of the first embodiment described above, the peak of the output signal is obtained in a range of n<0.5, and the maximum amplitude exists at around 1.0 mm in this case. In the second embodiment, a considerably effective signal amplitude is obtained in proximity to the optimum gap position (=5.4 mm) obtained from Conditional Expression (6) related to the three-grating type. Then, a gap, with which there is obtained a higher signal amplitude, exists in proximity to 1 mm, as shown in FIG. 10D.

In the first embodiment described above, the maximum amplitude exists in proximity to the received light intensity peak position that is around 2 mm. In this second embodiment, however, a valley of the contrast value exists in proximity to the peak position of the received light intensity, so that the maximum amplitude position deviates from the peak of the received light intensity, and the signal amplitude peak exists in proximity to 1 mm.

If the maximum amplitude generating position in the second embodiment is expressed using the value of "n" in the conditional expression, an effective gap position is given within a range of n<0.5.

Third Embodiment

A third embodiment differs from the first embodiment only in a size relation in a manner described below, as is the case of the second embodiment.

In this second embodiment, only $P_1$ and $P_2$ are changed and other sizes are completely the same as those in the first embodiment.

It is assumed that $P_1$ that is the pitch of the MRA scale is approximately equal to 21 μm, while $P_2$ that is the arrangement pitch of the array-shaped light source/the pitch between segments (S1, S2, and S3) of the photodiode array is approximately equal to 42 μm.

From the disclosed relational expression, the gap V(=U), with which an optimum interference fringe contrast is obtained through air conversion, becomes as follows when n that is a positive number is set at "1".

$$U = 2nP_1^2/\lambda$$
$$= 2 \times (21 \times 21 \div 0.65)$$
$$\approx 1,357 \ \mu m$$

Figure 10E:
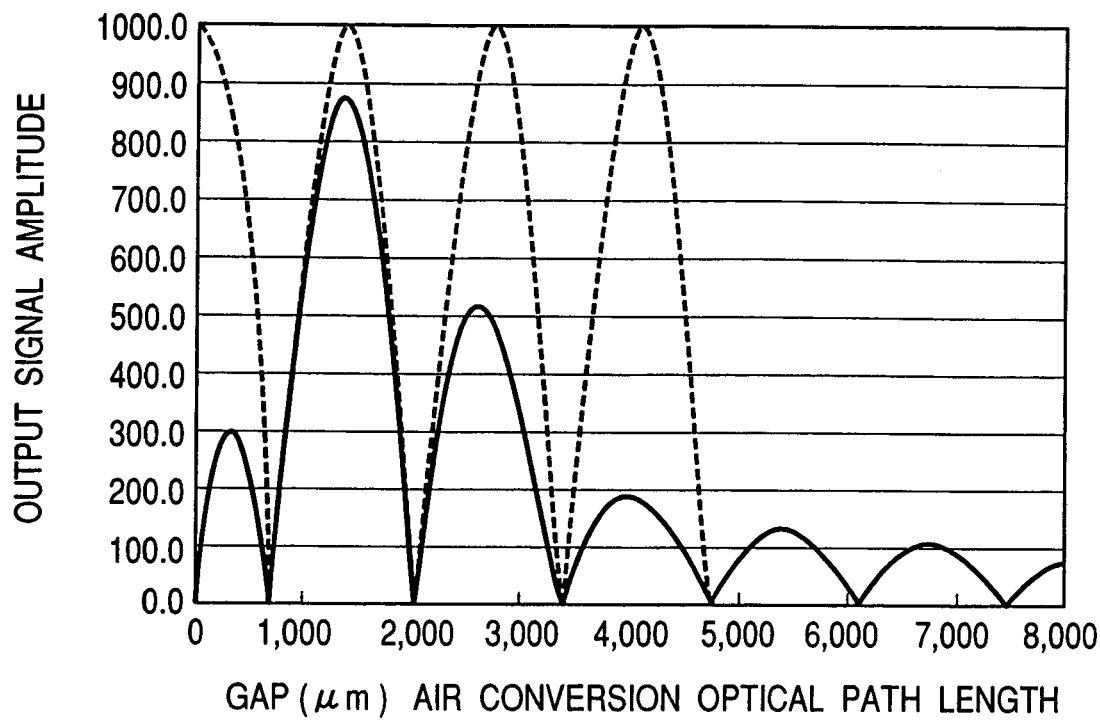

FIG. 10E shows results of experiments conducted in the third embodiment.

In this case, the peak of an output signal is obtained at a position of 1.357 mm. In the third embodiment, an effective signal amplitude is obtained in proximity to the optimum gap position (=1.357 mm) obtained from Conditional Expression (6) related to the three-grating type.

This is because the value of the optimum position obtained from Conditional Expression (6) comes close to the peak position of the received light intensity, so that there conditions meet.

Accordingly, if the maximum amplitude generating position in the third embodiment is expressed using the value of "n" in the conditional expression, an effective gap position is given within a range of 0.5<n<1.5

As to the optimum gap setting position, Conditional Expression (6) has been hitherto regarded as preferable in the case of the three-grating-type and reflection-type construction. When a substantial signal amplitude is considered, however, it is impossible to say that the arrangement derived from this Conditional Expression (6) is necessarily optimum.

The peak position of the received light intensity is critical, and the optimum arrangement is determined in a relation between the contrast peak position obtained from Conditional Expression (6) and this received light intensity peak position.

In the present invention, there is shown a relational expression that gives an optimum gap position in the three-grating-type and reflection-type construction. When doing so, the received light intensity peak position is controlled by changing the arrangement relation between the light source means and the light-receiving means so that the peak position of the received light intensity coincides with the contrast peak position, thereby making an attempt to obtain an output signal having the maximum amplitude with which these peak positions coincide with each other. Therefore, it is possible to realize this embodiment with the means described above.

Also, "n" in Conditional Expression (6) has been hitherto considered within a range of positive numbers. If the possible reflection scale pitch is set at around 84 μm or 42 μm as is the case of the first or second embodiment, the best position exists within a range of n<0.5, with the peak position of the received light intensity being more dominance than the contrast peak position. Also, when the pitch is set at around 21 μm as described in the third embodiment, it is preferable that a relation is realized with which the contrast peak position 0.5<n<1.5 coincides with the received light intensity peak position.

Figure 10F:
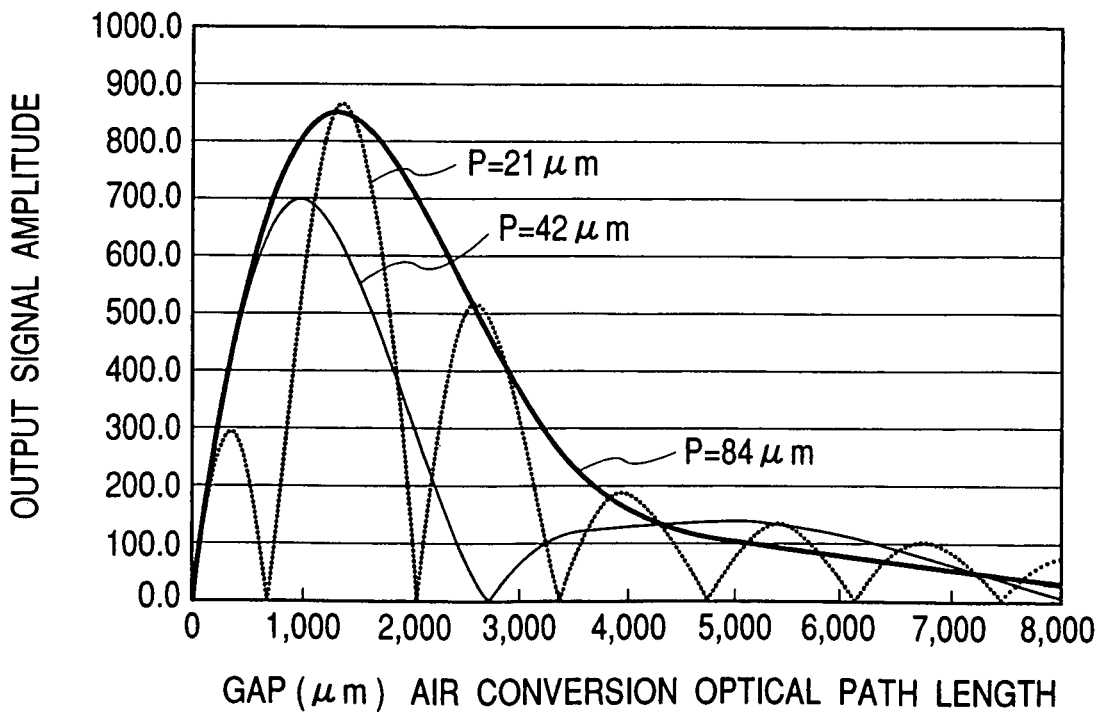

FIG. 10F collectively shows the results obtained in the first to third embodiments.

Fourth Embodiment

Figure 11:
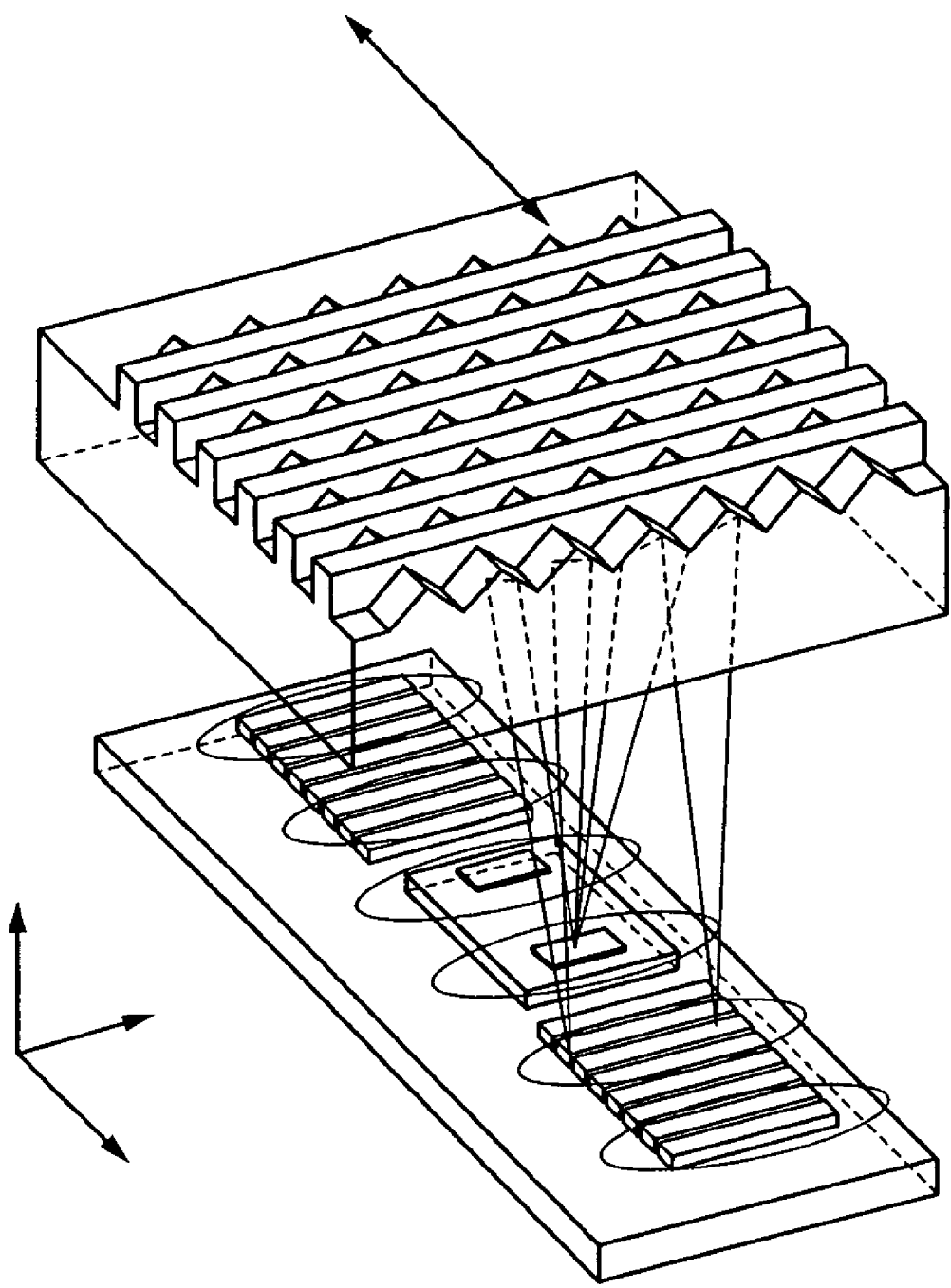
FIG. 11 is a schematic drawing of the main portion of an optical system of a fourth embodiment of the present invention.

When Ra is set at 90° and the pitch Pm is set at a size with which no problem occurs, a construction shown in FIG. 11 is applicable as an example of a realizable arrangement construction of the light-emitting means 1 and the light-receiving means 2. In FIG. 11, the reflection scale 3 is produced using a translucent member and the angle Ra is set at 90°.

In this case, a chip of the LED 1 is mounted and implemented on the silicon photodiode chip of the light-receiving element 2, which makes it possible to avoid the problems described above. It is possible to say that this construction is preferable when its high mounting density is considered, although it is required to give consideration to heat generation of the LED 1.

From the viewpoint of mounting, it is preferable that an angle offset is given (set at an angle larger than 90°), and the silicon photodiode 2 and the LED chip 1 are mounted on the same mounting surface in parallel, as shown in FIG. 14.

FIGS. 12A to 14B are each an explanatory drawing related to another embodiment of the MRA reflection scale functioning as the reflecting means of the present invention. In these drawings, there are shown several examples in which a light beam emitted from the light source 1 (L) and reflected by the reflecting body 3 is guided to the light-receiving element 2 (P) with more efficiency.

Fifth Embodiment

FIG. 12A shows a basic construction (Ra is set at 95°) for comparison.

FIG. 12B relates to this fifth embodiment and shows a state where V-letter shaped grooves are arranged along a cylindrical surface CL (partial surface of a cylinder). This arrangement is effective when a translucent member is used and, in comparison with the construction in FIG. 12A with which limitations tend to be imposed on the condition of total reflection, it is possible to widen an allowable range of an incident angle of a light beam onto the surfaces of the V-letter shaped grooves.

Sixth Embodiment

FIG. 12C relates to a sixth embodiment and shows an example in which the V-letter shaped grooves are arranged in a straight line manner while maintaining the directions of respective V-letter shaped grooves in FIG. 12B (angle directions indicated by the alternate long and short dash lines). In FIG. 12B, the reflecting body is bent and therefore increases in thickness. In this example, however, this problem is solved.

Seventh Embodiment

Figure 13B:
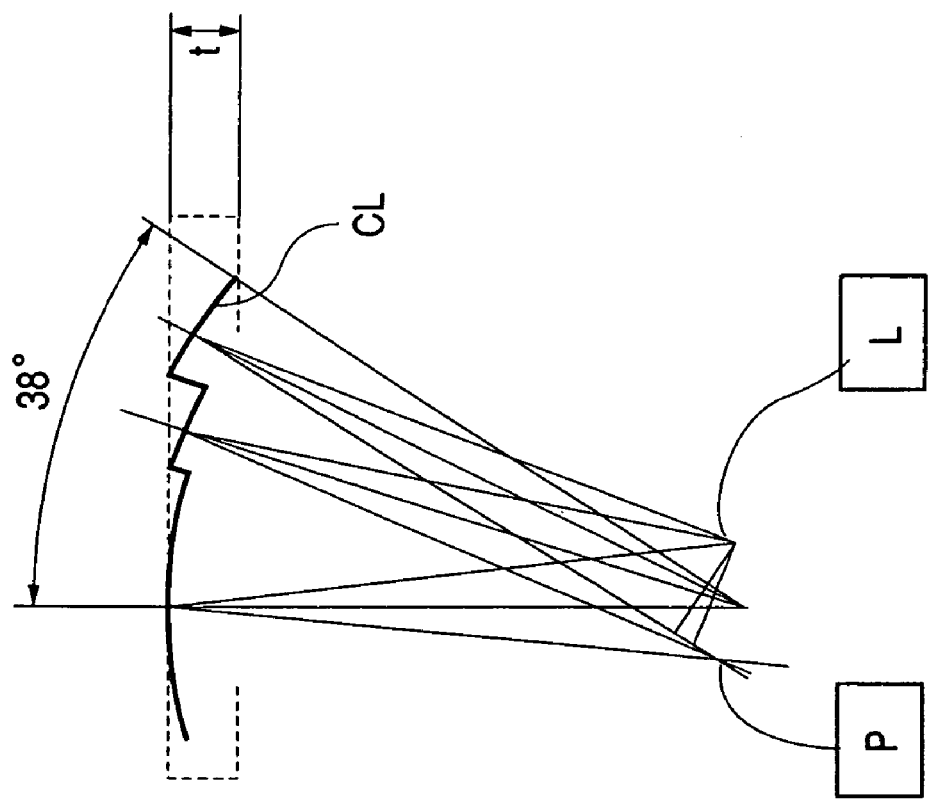
FIGS. 13A and 13B are each a schematic drawing showing the shape of the main portion of another embodiment of the reflecting body of the present invention.
Figure 13A:
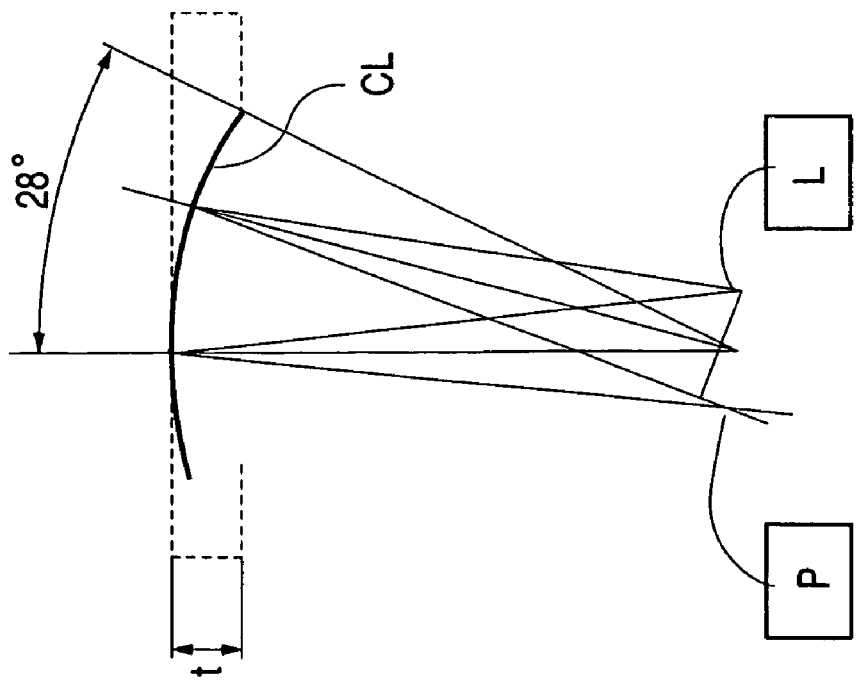

The concept of the present invention is applicable not only to the V-letter shaped grooves but also to an example of FIG. 13A (seventh embodiment), or a modification thereof, which is shown in FIG. 13B (eighth embodiment).

FIG. 13A relates to a seventh embodiment and shows an example of a one-dimensional convergent reflecting element obtained by forming a reflecting film on a cylindrical surface CL through evaporation of aluminum or the like. As is the case of the aforementioned type using V-letter shaped grooves, it is possible to solve the problems of the conventional techniques.

Eighth Embodiment

FIG. 13B relates to an eighth embodiment and shows a construction where the cylindrical surface CL is divided into curved surfaces having different curvatures, and the curved surfaces are combined with each other, thereby avoiding the problem that the thickness is increased. A reflecting film is applied to each surface obtained by dividing the cylindrical surface CL.

As can be seen by comparing FIGS. 13A and 13B with each other under a condition where the one-dimensional convergent reflecting element is confined within a certain thickness, if the thickness is the same, a range, in which it is possible to guide a light beam from the light source to a light-receiving portion, is widened by around 10° in the case of FIG. 13B in which the cylindrical curved surface is divided. As a result of this modification, the usage efficiency of light intensity is further enhanced.

Ninth Embodiment

Figure 14B:
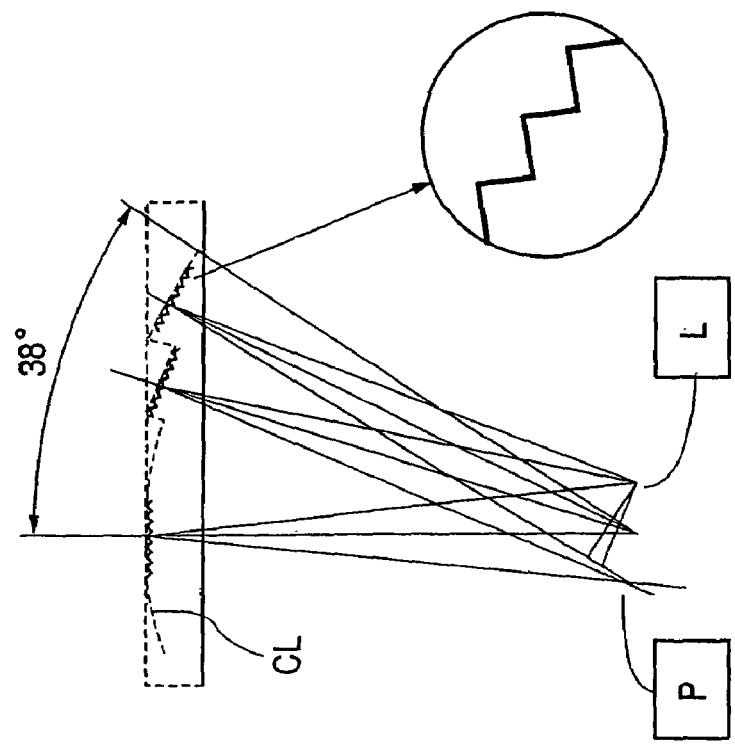
FIGS. 14A and 14B are each a schematic drawing showing the shape of the main portion of still another embodiment of the reflecting body of the present invention.
Figure 14A:
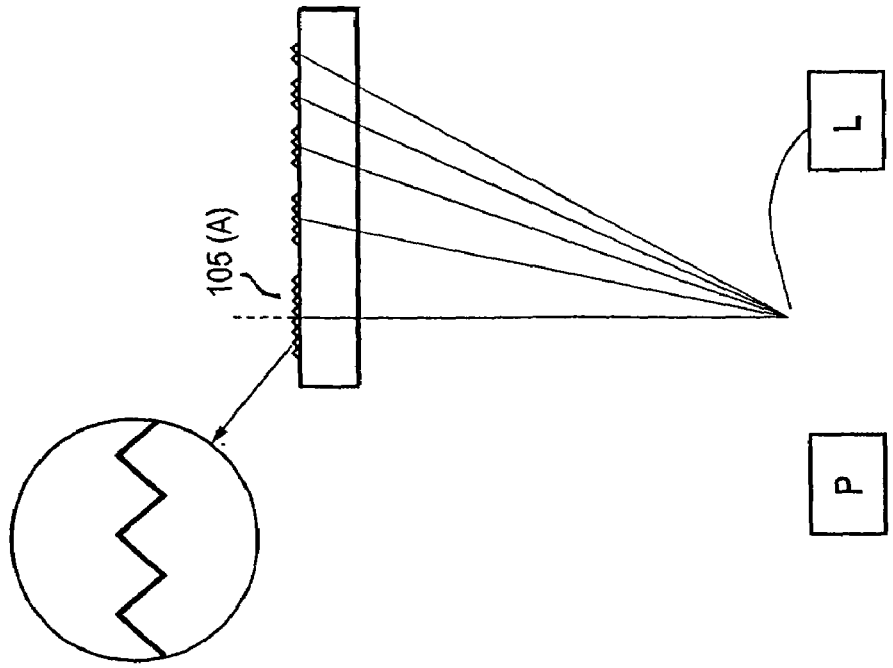

FIG. 14A shows a case where a reflection-type Fresnel zone plate is used as the reflecting body. In this case, a reflecting surface is formed in a reflecting portion 105 (A) by utilizing an internal total reflection action of the V-letter shaped grooves.

Tenth Embodiment

FIG. 14B shows a case where the aforementioned construction in FIG. 13B is further improved. In this drawing, no aluminum reflecting film is applied to the divided cylindrical surface CL, and reflecting surfaces are substantially formed by utilizing the internal total reflection action of the V-letter shaped grooves.

Figure 15:
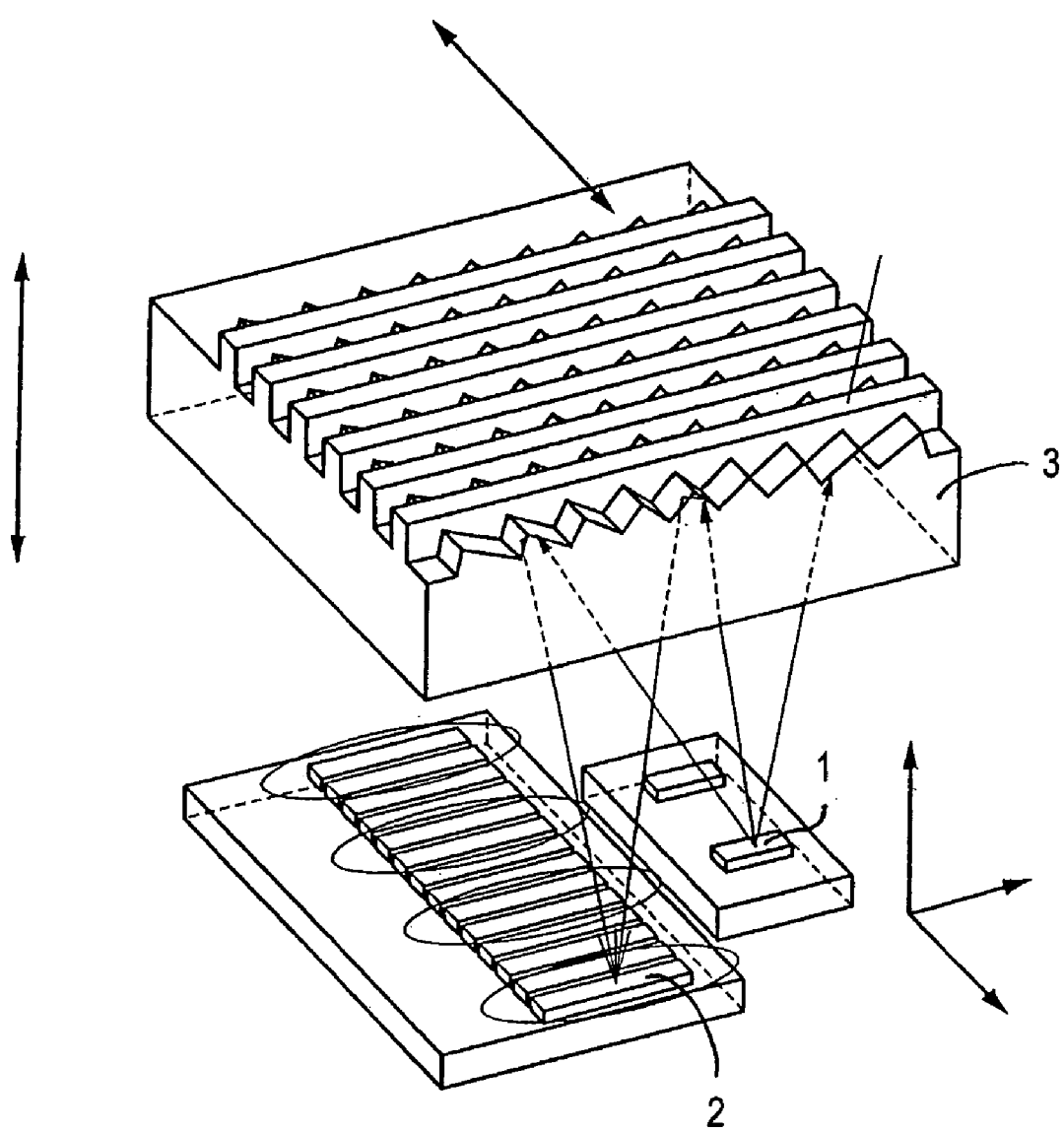
FIG. 15 is a schematic drawing showing the shape of the main portion of another embodiment of the reflecting body of the present invention.

FIG. 15 shows a construction where the aforementioned reflecting body 3 having the one-dimensional convergent reflecting element in FIG. 12C is applied as a reflection scale for a linear encoder. In this drawing, reference numeral 1 denotes a light source of a photosensor PS, while reference numeral 2 indicates a light-receiving portion of the photosensor PS.

Eleventh Embodiment

Figure 16:
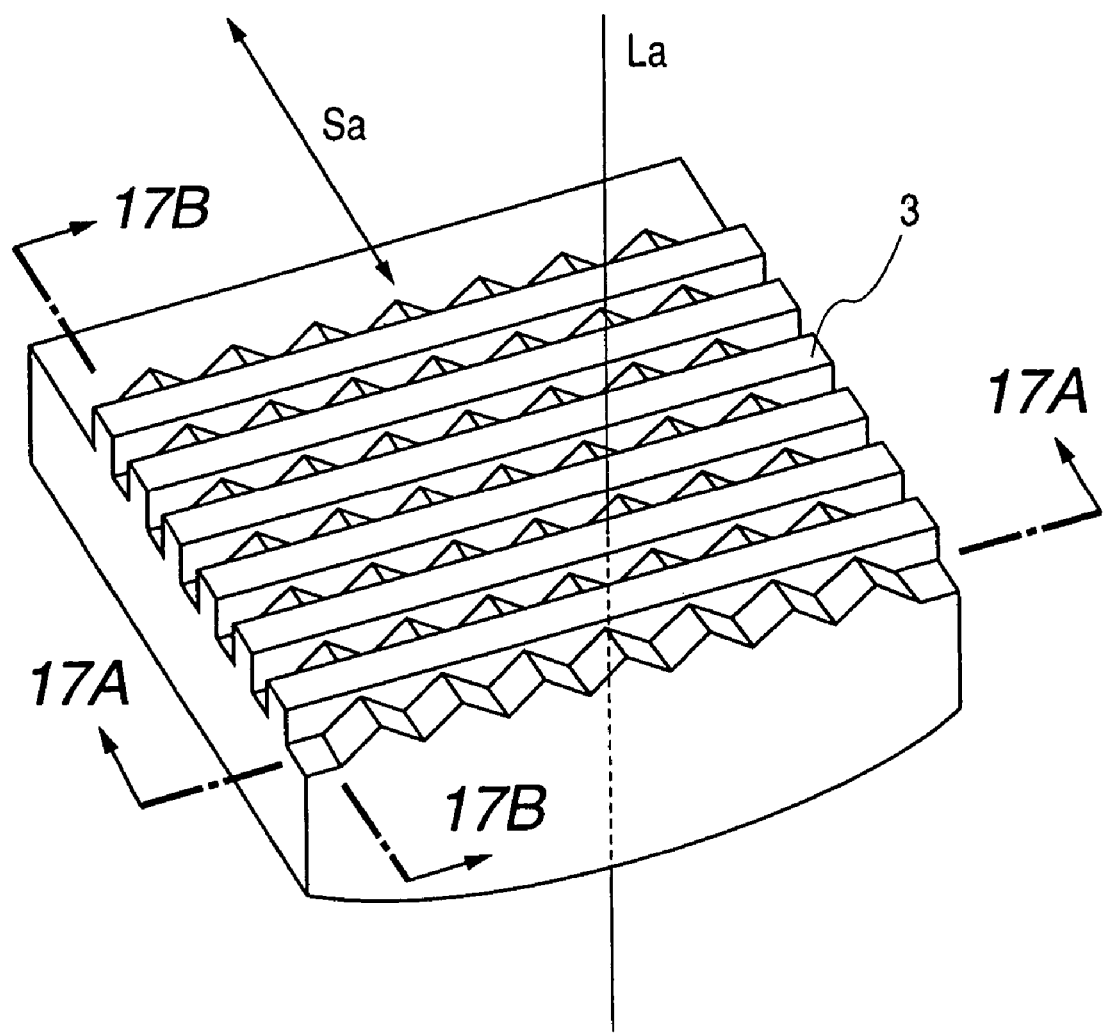
FIG. 16 is a schematic drawing showing the shape of the main portion of another embodiment of the reflecting body of the present invention.
Figure 17A:
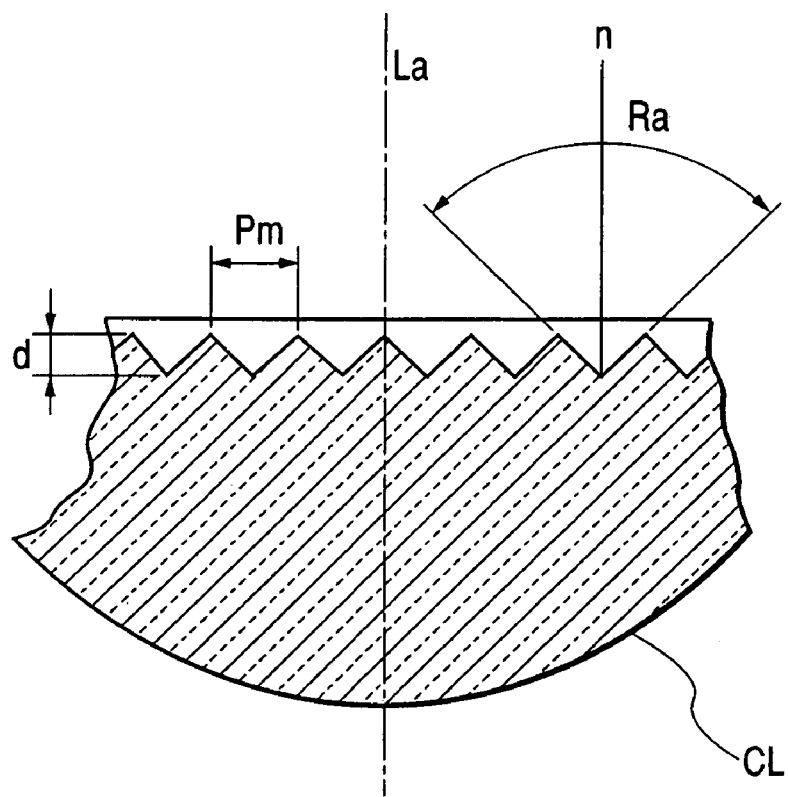
FIGS. 17A and 17B are each a schematic drawing showing the cross-sectional shape of another embodiment of the reflecting body of the present invention.
Figure 17B:
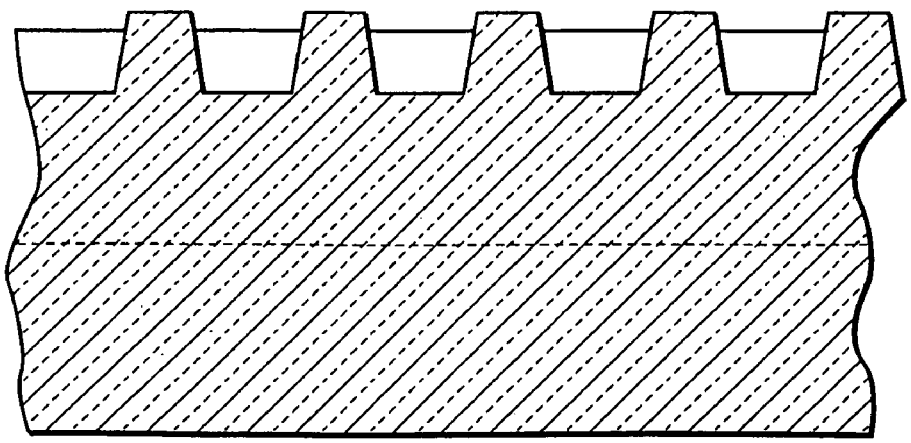

In FIGS. 16, 17A, and 17B, according to the construction of the first embodiment where the reflection scale 3 of the reflection-type linear encoder is produced by periodically providing the V-letter shaped groove group OE for a translucent member TT1, the cylindrical surface CL is integrally or independently provided on the underside of the transparent substrate, thereby enhancing the light usage efficiency. Its 17A—17A cross-sectional view and 17B—17B cross-sectional view are respectively shown in FIGS. 17A and 17B. A divergent light beam from a light source is converted on the cylindrical surface CL into an almost parallel light beam, repeats internal total reflection twice on the V-letter shaped groove surface, is converted into a convergent light beam while passing through the cylindrical surface CL again, and is guided to a light-receiving portion (not shown).

Figure 18:
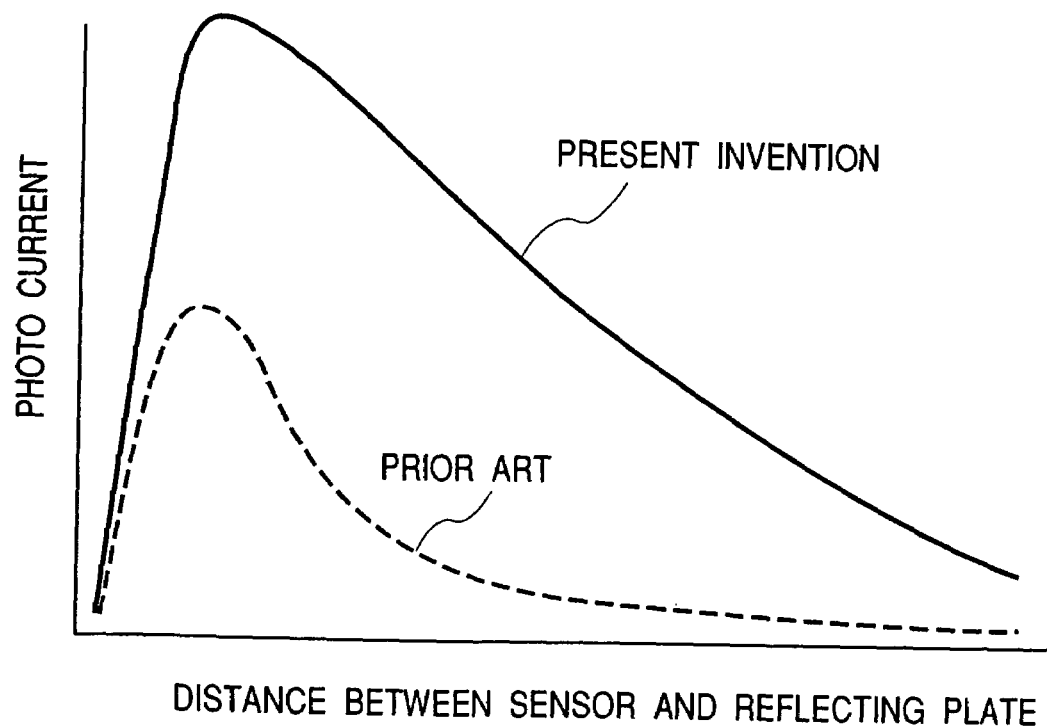
FIG. 18 is an explanatory drawing showing a difference in received light intensity between the reflecting body according to the present invention and a conventional reflecting body.

FIG. 18 is an explanatory drawing of a comparison result on a relation between (a) a distance between a photosensor in the case where the reflecting body having the one-dimensional convergence reflecting element of the present invention that has been hitherto explained is applied to, for instance, an encoder and the reflecting body and (b) the value of a photo current generated when the light-receiving portion of the photosensor detects light, a relation in the case of using a conventional reflecting plate (reflecting body produced by evaporating aluminum to a flat plate). When there is used the one-dimensional convergent reflecting element of the present invention, there is increased the absolute light intensity that is receivable, and therefore a large photo current is obtained. As a result, a photo current peak increases.

Meanwhile, in contrast to the conventional distance characteristic "1/(distance)$^2$", there is obtained a distance characteristic "1/distance" in the present embodiment, which means that it is possible to obtain a superior characteristic.

It should be noted here that the present invention has been described by taking a linear-type encoder as an example, although the present invention is also applicable as a scale for reflection-type rotary encoder in a like manner.

Twelfth Embodiment

Example of Application to Video Lens

Figure 35:
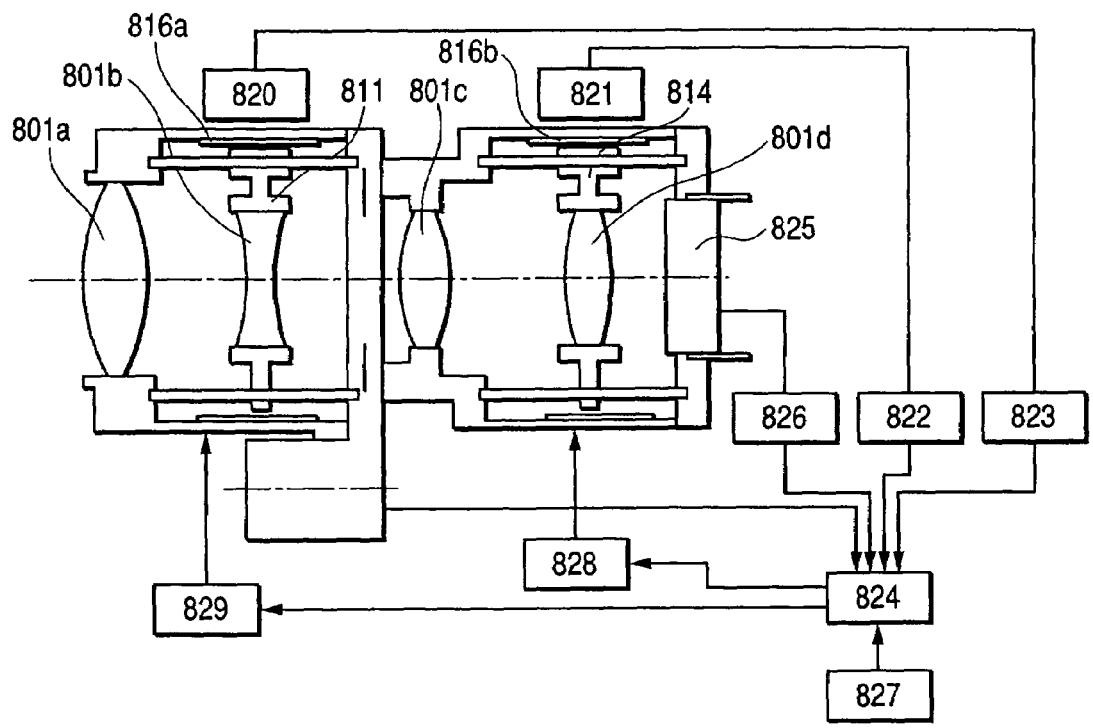
FIG. 35 shows a state where an encoder of the present invention is provided as an encoder for video lens AF and an encoder for zooming.

FIG. 35 shows an example in which a video lens system is formed using a voice coil actuator. In this drawing, there is obtained a construction where a lens group 801b of variator lenses for magnification and a lens group 801d of focus lenses are driven using the voice coil actuator, and encoders for zooming 816a and 820 and encoders for auto-focusing 816b and 821 are attached to detect the absolute positions of the lens groups 801b and 801d.

The construction elements 816a and 816b are each a linear encoder scale according to the present invention, while the construction elements 820 and 821 are each the detecting head according to the present invention.

Outputs from the detecting heads 820 and 821 are respectively read by reading circuits 822 and 823 and are sent to a CPU 824. Also, information concerning a focus state is sent to the CPU 824 through a reading circuit 826 by means of a video signal from a CCD 825.

The CPU 824 determines the value or waveform of a current that should be allowed to pass through each voice coil based on the received information as well as information prestored in a ROM 827 and energizes the coils 816a and 816b through their corresponding drivers 828 and 829. With this system, the lens group 801b and the lens group 801d are positioned so that an in-focus state is always maintained.

When a video lens system is constructed using a voice coil actuator like in this example, it becomes necessary to use an ultra-small and high-accuracy encoder for performing lens position detection. In this drawing, the construction elements 820 and 821 are equipped with the detecting head of the present invention. The sensitivity of the optical system to positioning tends to be increased in accordance with a reduction in size, so that a high-resolution and high-accuracy encoder becomes necessary. Also, in these devices whose power consumption should be reduced, the low-power consumption encoder according to the present invention has an important effect in view of application as well as the aforementioned features.

Conventionally, as the encoders 820 and 821, there has been used a type, in which a brush traces an electrode for which a linear-type volume or a gray code pattern has been formed, or a type in which position detection is performed using a photoelectric conversion element, such as a PSD, and an optical element that moves along with a lens holding frame.

By applying the optical encoder of the present invention, it becomes possible to perform position detection in a non-contact manner and also to realize a significant reduction in mounting space. As a result, there is enhanced flexibility in designing a lens-barrel.

Thirteenth Embodiment

Example of Application to Ink Jet Printer for Controlling Carriage Position

Figure 36:
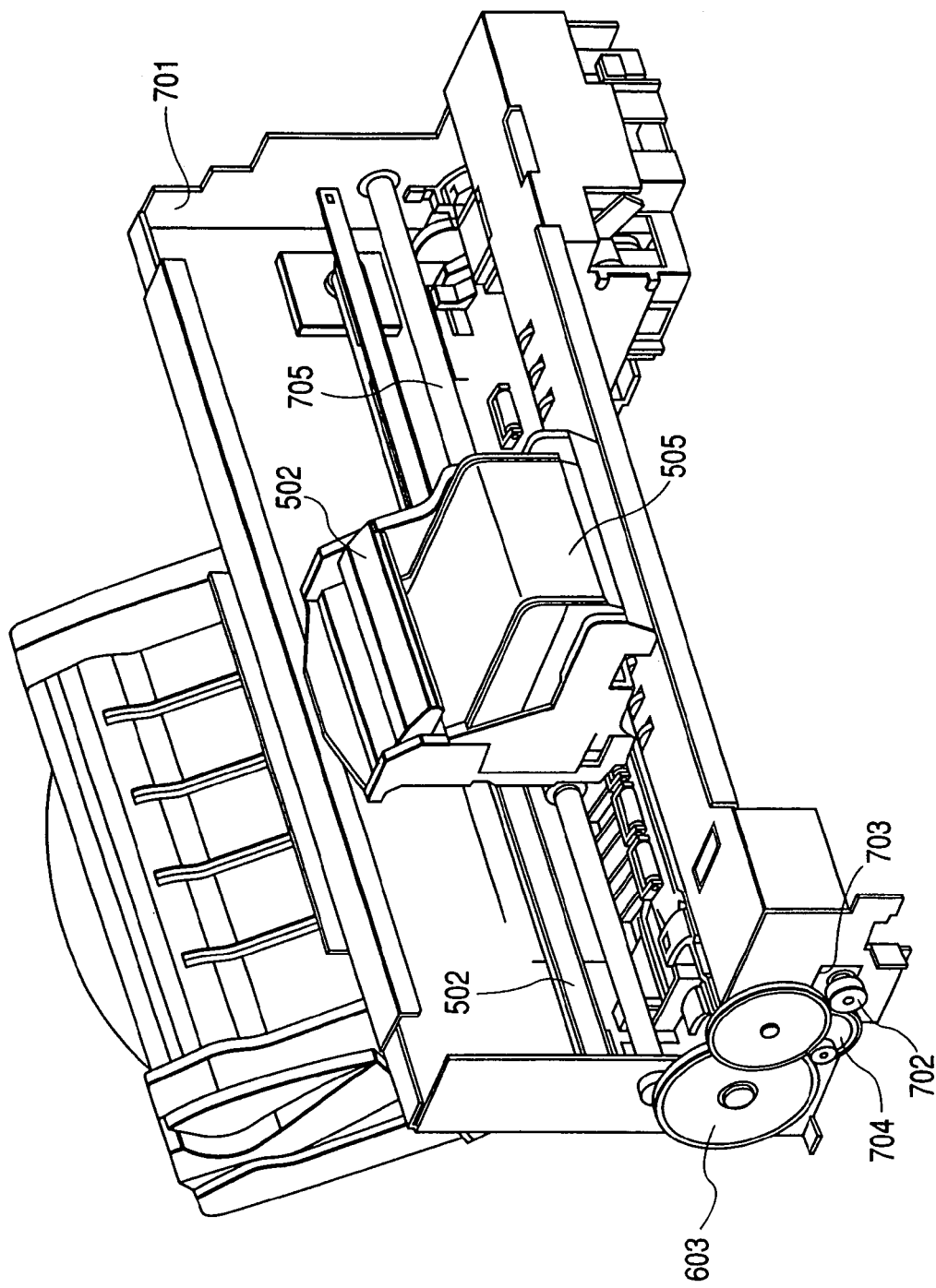
FIG. 36 shows a state where the encoder of the present invention is applied to an ink jet printer.

FIG. 36 shows an example in which the optical reflection encoder scale and head according to the present invention are used in order to control driving of a print head of an ink jet printer.

The main portion of the printer will be described with reference to FIG. 36.

In this drawing, reference numeral 701 denotes a case, numeral 505 a carriage unit containing a print head, an ink tank, and the like, numeral 705 a guiding rod, numeral 703 a drive motor for transporting paper, numeral 703 a gear on a drive axis, numeral 704 an idler gear, numeral 603 a gear placed on the main axis of a transport roller. Here, an encoder for detecting a rotation angle is also placed on this axis.

A linear encoder scale 502 of the present invention extends parallel to the guiding rod 705, with one end thereof being fixed to the case 701 and the other end being fixed to the case 701 through a not-shown plate spring. The scale 502 in this embodiment is produced by providing a transparent film made of transparent polycarbonate with the minute groove shape of the present invention at predetermined intervals.

Figure 37:
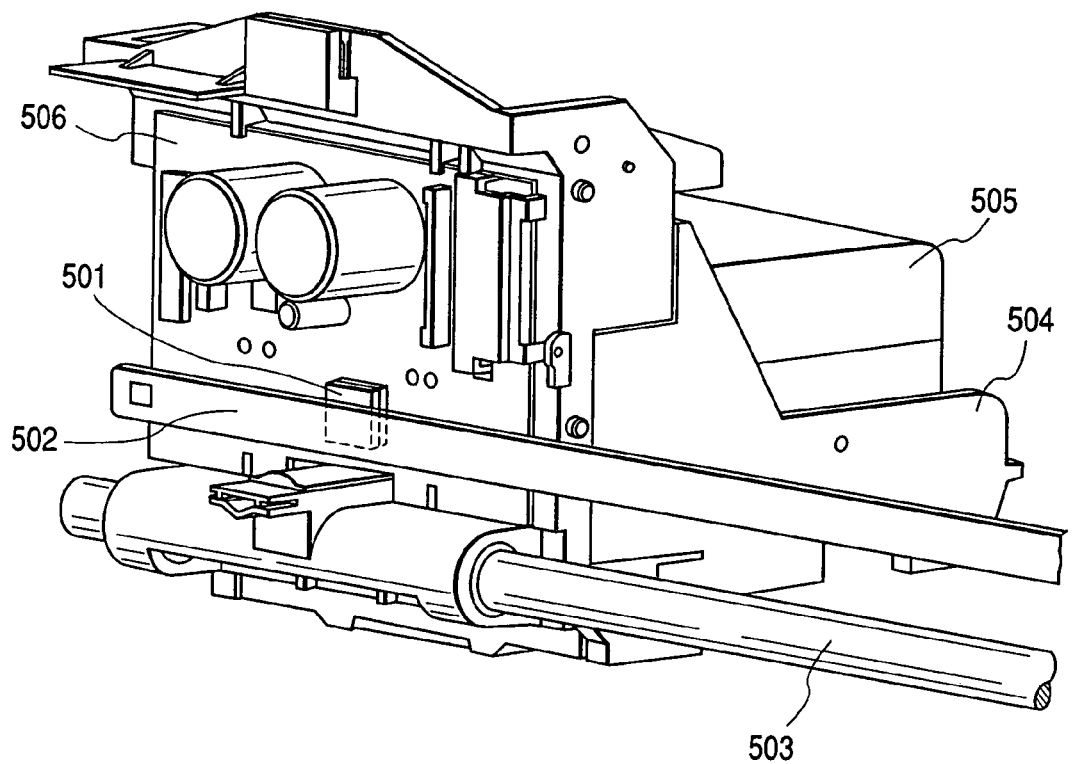
FIG. 37 shows a state where the encoder of the present invention is provided as an encoder for a print head sending control portion of an ink jet printer.

FIG. 37 is an explanatory drawing of the encoder portion of the present invention placed on the carriage. In this drawing, reference numeral 502 denotes the linear encoder scale according to the present invention that is placed in the case 701 shown in FIG. 36, numeral 501 a detecting head according to the present invention that is mounted on a substrate 506 attached to the carriage 504 along with a drive circuit for driving an ink jet head and the like.

In particular, in the linear encoder for controlling the driving of the carriage of this ink jet printer, a space available for mounting the encoder detecting head is limited. The detecting head according to the present invention has a ultra-small size, and therefore it is easy to mount this detecting head. That is, it is easy to embed the present detecting head into a printer, in comparison with a conventional transmission-type encoder. From the viewpoint of low power consumption, the application to a mobile printer or the like becomes a further effective means.

Fourteenth Embodiment

Figure 38:
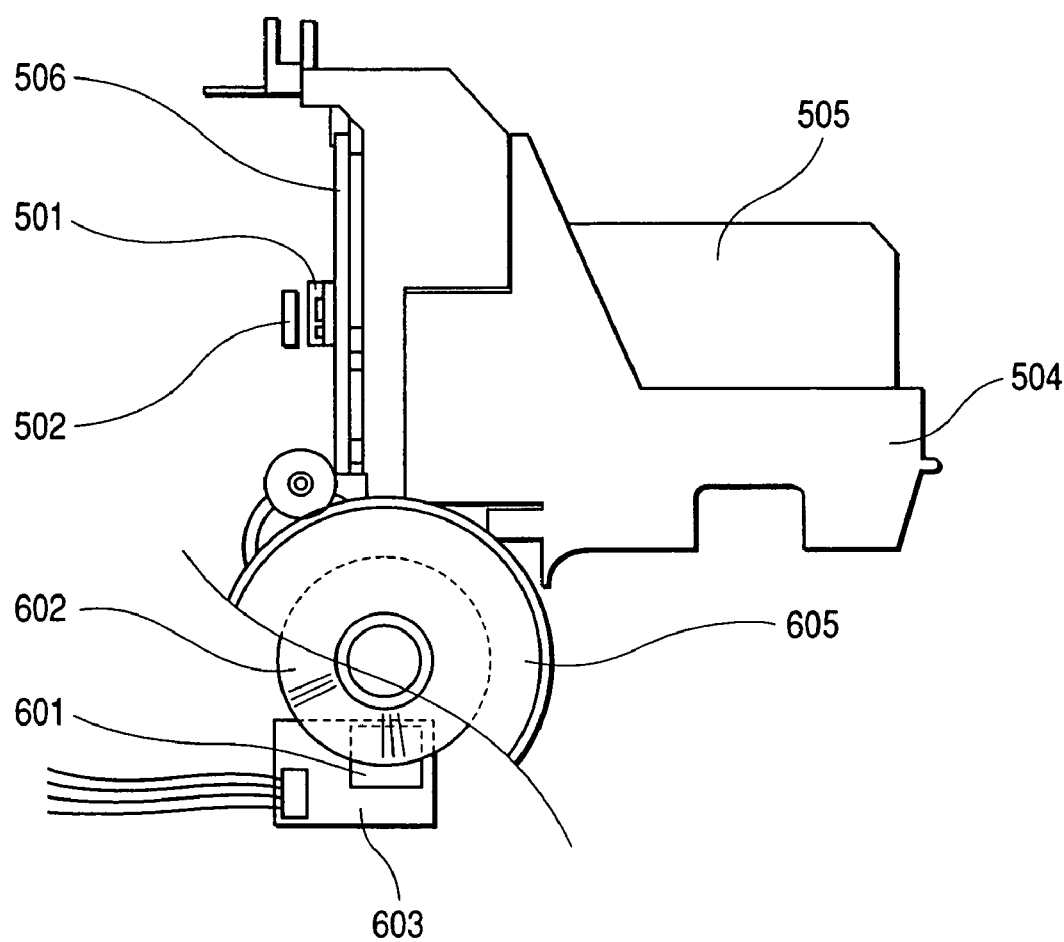
FIG. 38 shows a state where the encoder of the present invention is provided as an encoder for a sheet transport control portion of an ink jet printer.

Example of Application to Ink Jet Printer for Controlling Paper Transport Angle and Position In the case of an ink jet printer, not only the linear encoder for controlling the position of the carriage but also a rotary encoder for detecting a rotation angle of a paper feeding roller are required. FIG. 38 shows a state where the printer is viewed from a side thereof. In this drawing, there are illustrated a rotary encoder scale 602 that is mounted and hidden behind a main paper transport roller drive gear, a detecting head 601, and a base 603 on which the detecting head 601 is mounted.

As a result of the present invention, it becomes possible to realize high-resolution and high-precision electrical division, which in turn makes it possible to reduce the diameter of a rotary encoder scale for performing angle detection. As a result, although a large-diameter encoder scale has been hitherto used in order to detect paper sending position with high resolution, it becomes possible to reduce the size of the rotary encoder scale so as to become smaller than the diameter of a gear for driving, as shown in this drawing. In the case of an apparatus or the like, such as a mobile printer, for which it is required to perform designing for ultra-miniaturization, the present invention achieves a particularly enormous effect. As is the case of the aforementioned embodiment related to a linear encoder, the application of the present invention to a mobile printer or the like becomes a further effective means even from the viewpoint of low power consumption.

As described above, according to the present invention, by appropriately constructing a reflecting element provided for a reflecting body that is the target of measurement and observation, it becomes possible to obtain a high light transmission efficiency without applying a lens to a light source means and a light-receiving means and to obtain a characteristic where there is lowered a sensitivity to a relative positional deviation between a reflecting body and the light-receiving means. As a result, it becomes possible to attain a reflecting body, whose presence or absence and moving state are capable of being detected with high precision, and an optical apparatus, such as an encoder, using the reflecting body.

In addition, according to the present invention, there are obtained the following effects, for instance.

When the reflecting body is used as a marker member for an optical sensor/optical scale, there is obtained a high light transmission efficiency between light emission and light reception.

Also, there is obtained a characteristic where there is lowered a sensitivity to a relative positional deviation between a reflecting body and a sensor.

Further, it becomes possible to reduce the size and thickness of a sensor because no lens is required.

Also, it is possible to manufacture a reflection scale/reflecting surface marker body with injection Mo or a press technique, which means that it is not required to apply a reflecting film or the like. As a result, a processing cost is reduced, which means that the present invention is effective for cost reduction.

Also, by applying the sensor of the present invention to various kinds of information devices, video devices, and the like, it becomes possible to detect displacement information containing the moving direction of a moving body with high precision while realizing overall simplification, miniaturization, and reduction in power consumption of an apparatus.

What is claimed is:

1. An optical encoder comprising:
a light source;
a scale having a reflecting portion that is arranged so as to oppose the light source; and
a light-receiving element that receives a reflected light beam from the scale,
wherein the reflecting portion of the scale has an optical characteristic such that a divergent light beam from the light source is divided into a plurality of wavefronts after a plurality of reflections, and respective light beams obtained as a result of the division are made to overlap each other at a predetermined position,
wherein an air conversion optical path length from a light-receiving surface position of the light-receiving element to a reflecting surface of the scale is referred to as gP, a pitch of the scale is referred to as P1, one of a center wavelength of an output peak value of a light beam emitted from the light source and a wavelength of a center value obtained through integration of spectral distribution is referred to as λ, gap is set at gP which is determined so that the following relations are satisfied within a range of n<0.5

$gP=2n(P1)^2/\lambda.$

2. An optical encoder according to claim 1, wherein a peak position of received light intensity is set so as to coincide within the range.

3. An optical apparatus including the optical encoder according to claim 1.

4. A printer including the optical encoder according to claim 1.

5. An optical encoder comprising:
a light source;
a scale having a reflecting portion that is arranged so as to oppose the light source; and
a light-receiving element that receives a reflected light beam from the scale,
wherein the reflecting portion of the scale has an optical characteristic such that a divergent light beam from the light source is divided into a plurality of wavefronts after a plurality of reflections, and respective light beams obtained as a result of the division are made to overlap each other at an predetermined position, wherein an air conversion optical path length from a light-receiving surface position of the light-receiving element to a reflecting surface of the scale is referred to as gP, a pitch of the scale is referred to as P1, one of a center wavelength of an output peak value of a light beam emitted from the light source and a wavelength of a center value obtained through integration of spectral distribution is referred to as λ, gap is set at gP which is determined so that the following relations are satisfied within a range of 0.5<n<1.5

$gP=2n(P1)^2/\lambda.$

* * * * *

UNITED STATES PATENT AND TRADEMARK OFFICE
CERTIFICATE OF CORRECTION

PATENT NO. : 7,045,770 B2
APPLICATION NO. : 11/216900
DATED : May 16, 2006
INVENTOR(S) : Masahiko Igaki et al.

It is certified that error appears in the above-identified patent and that said Letters Patent is hereby corrected as shown below:

At column 6, line 30, please insert the following graph:

--In particular, the present invention has the following features.--

At column 17, line 51, please delete the paragraph beginning "Please replace..." and substitute therefore:

--FIG. 10C is a characteristic drawing showing the changing of an output signal amplitude obtained from results of actual experiments.

In this embodiment, when the gap value is set at a position (approximately around 2.0 mm) at which there is exhibited the peak of intensity of reflected light, the output signal amplitude becomes the maximum, thereby obtaining a favorable characteristic.--

UNITED STATES PATENT AND TRADEMARK OFFICE
CERTIFICATE OF CORRECTION

PATENT NO. : 7,045,770 B2
APPLICATION NO. : 11/216900
DATED : May 16, 2006
INVENTOR(S) : Masahiko Igaki et al.

It is certified that error appears in the above-identified patent and that said Letters Patent is hereby corrected as shown below:

At column 19, line 3, please insert the following paragraph:

--Here, a preferable gap setting position will be calculated by concretely assuming important numerical values in the third embodiment, as is the case of the first embodiment described above.--

Signed and Sealed this

Twenty-sixth Day of September, 2006

JON W. DUDAS
*Director of the United States Patent and Trademark Office*